June 23, 1964  A. G. DE CLAIRE, JR  3,137,996
REACTION ENGINE CONTROL
Filed Feb. 23, 1961  14 Sheets-Sheet 1

INVENTOR.
ALTON G. DE CLAIRE JR.
BY
Walter Potoroka, Sr.
ATTORNEY

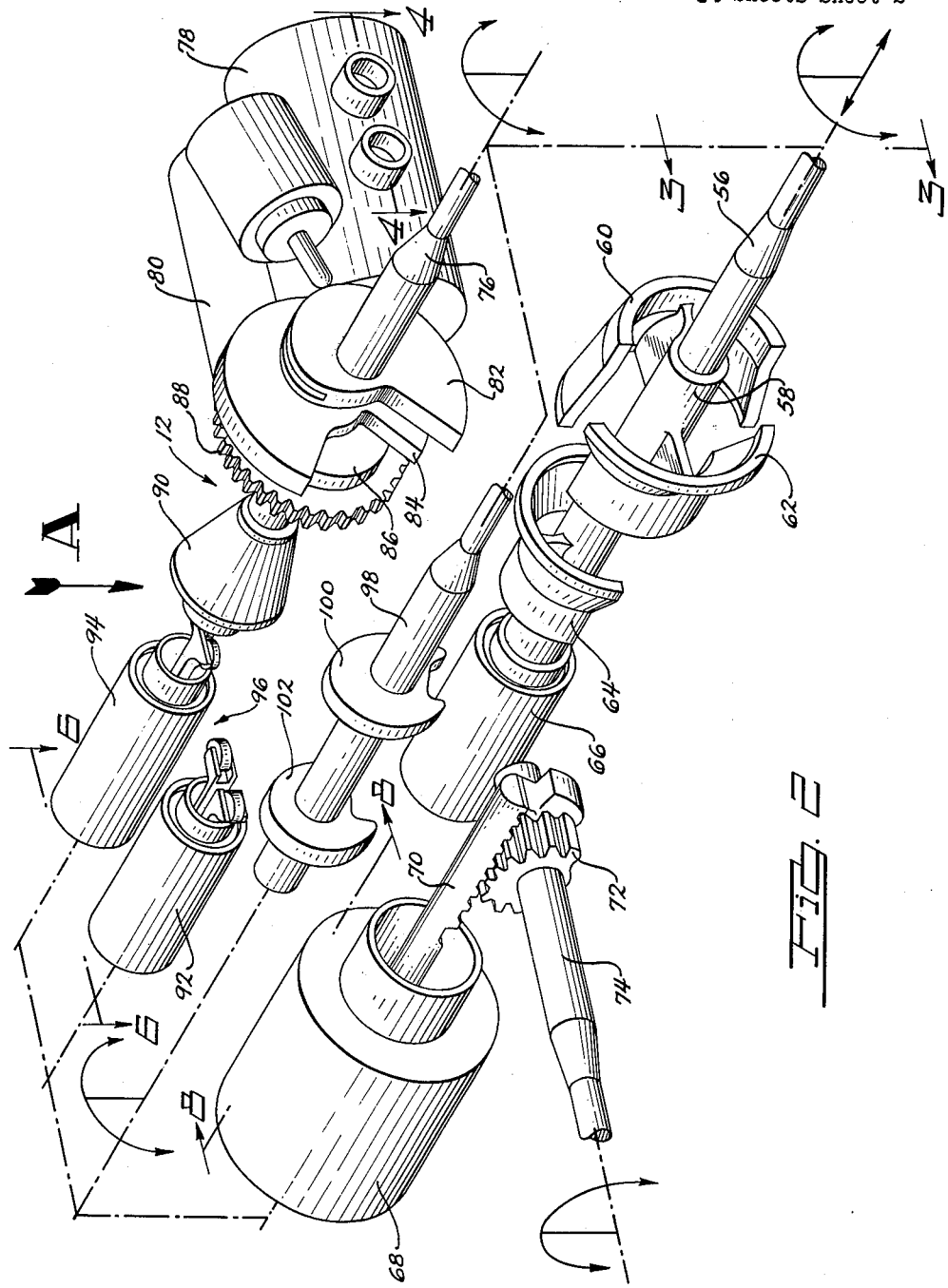

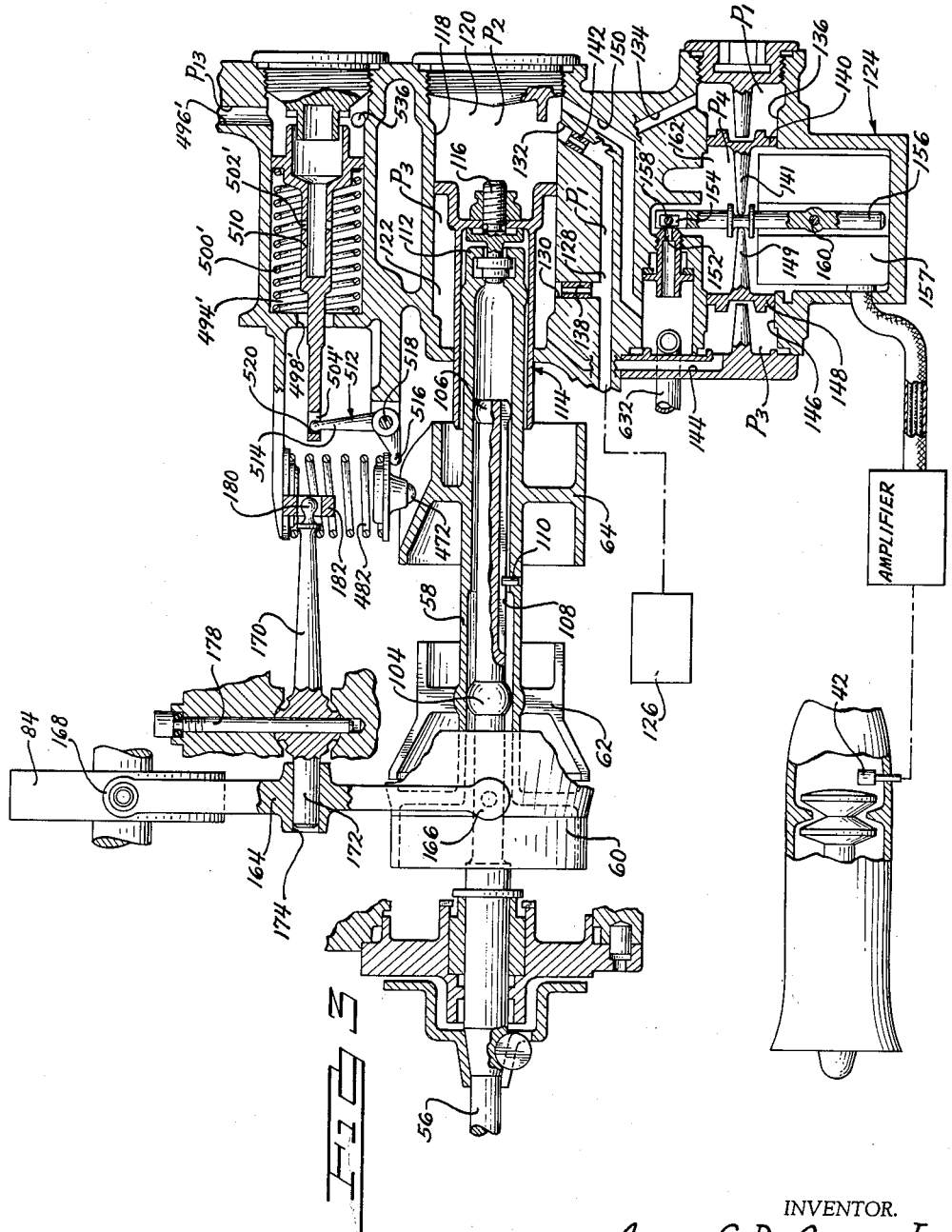

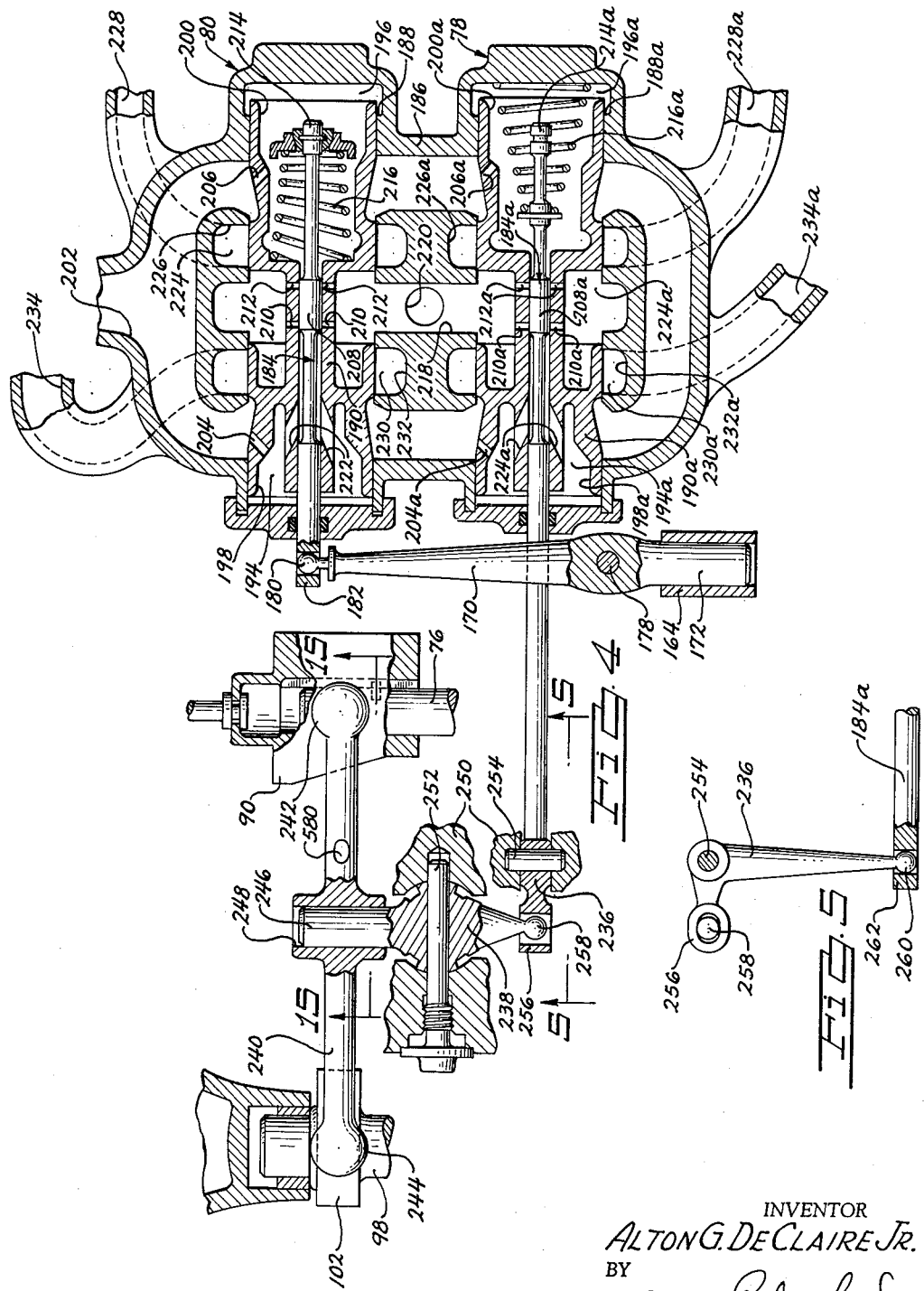

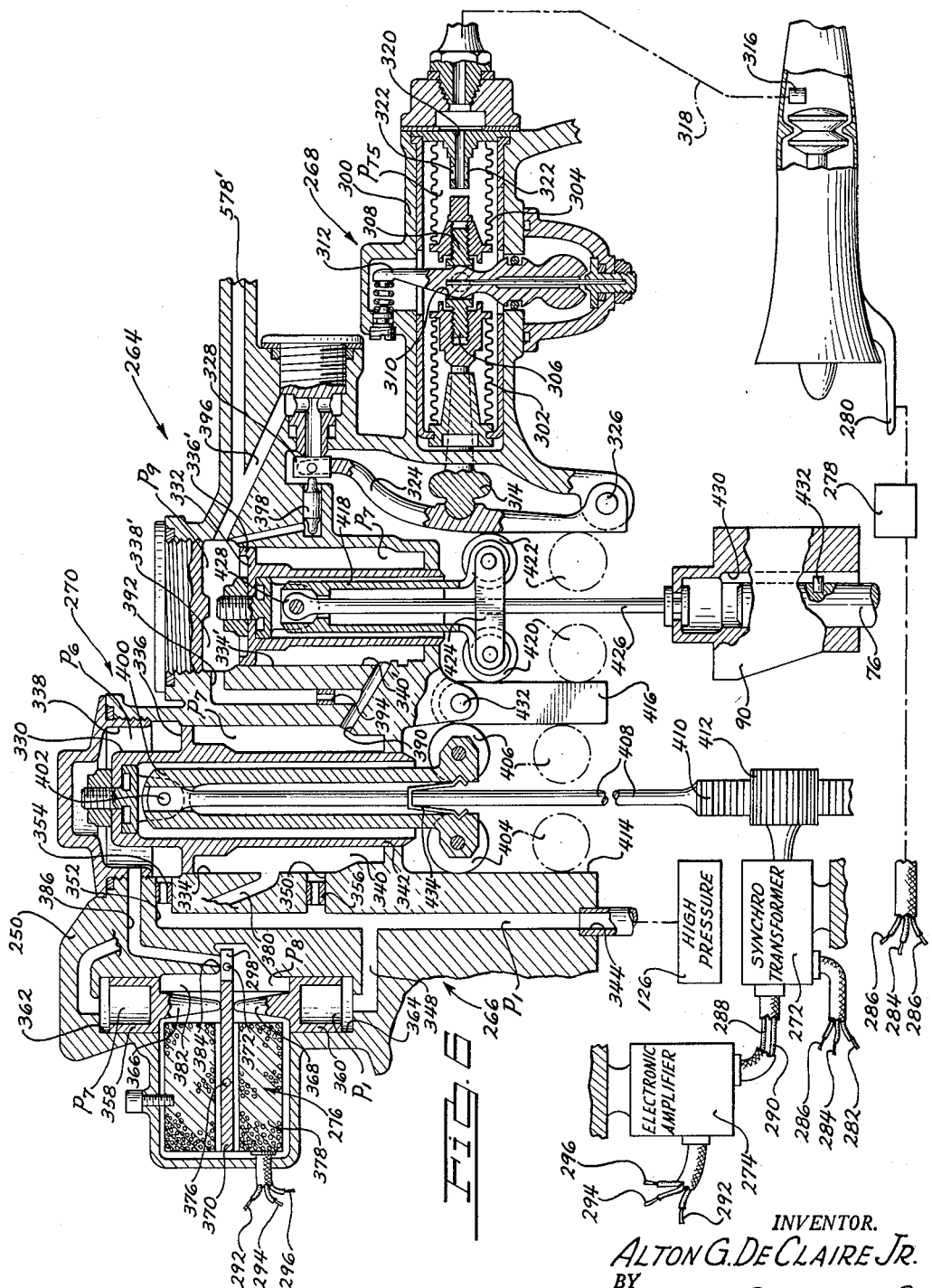

| LEGEND | |
|---|---|
| $F_S$ | BIASING FORCE OF SPRING 400 |
| $F_P$ | BIASING FORCE DUE TO $P_{TS}$ PRESSURE |
| $F_R$ | RESULTANT FORCE OF ROLLERS 420 & 422 |
| X | LEVER ARM OF $F_S$ |
| Y | LEVER ARM OF $F_R$ |
| Z | LEVER ARM OF $F_P$ |

INVENTOR.
ALTON G. DE CLAIRE JR.
BY
Walter Patoroka, Sr.
ATTORNEY

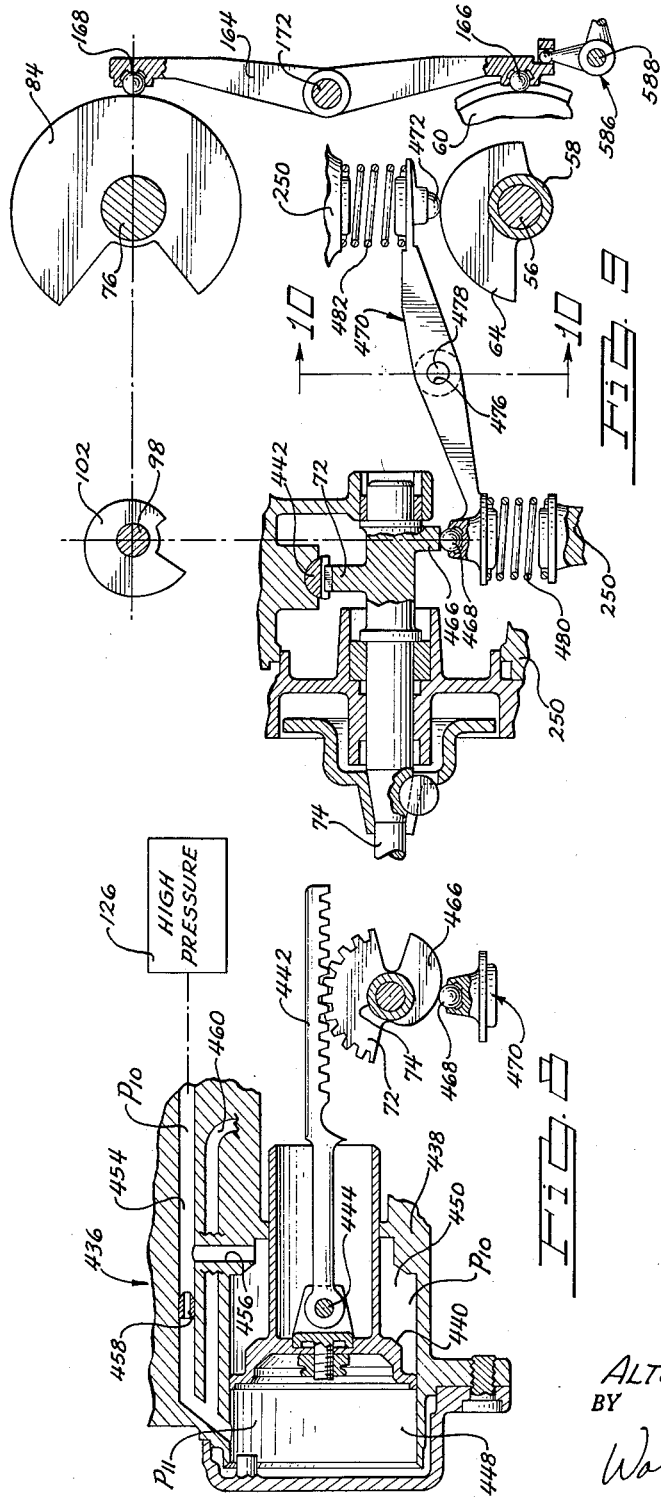

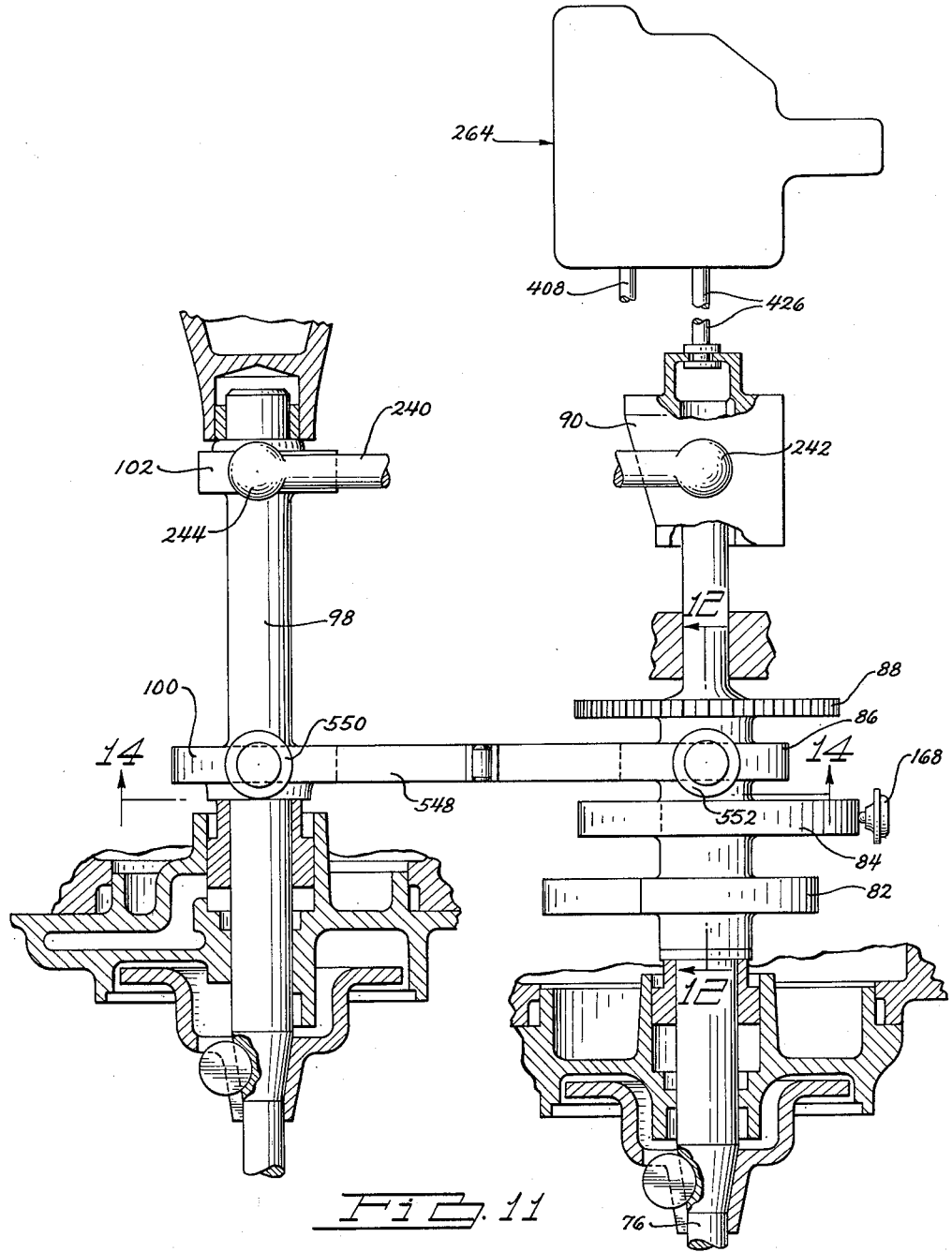

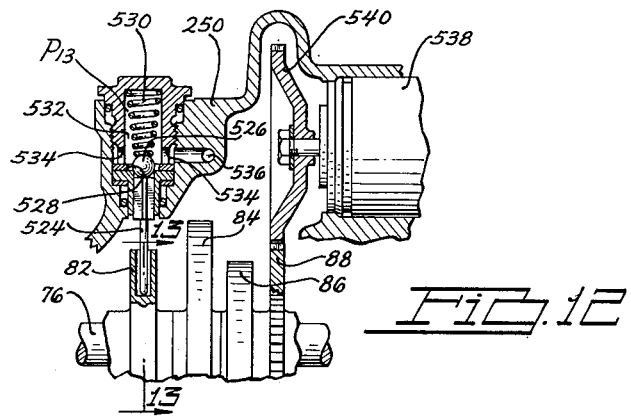
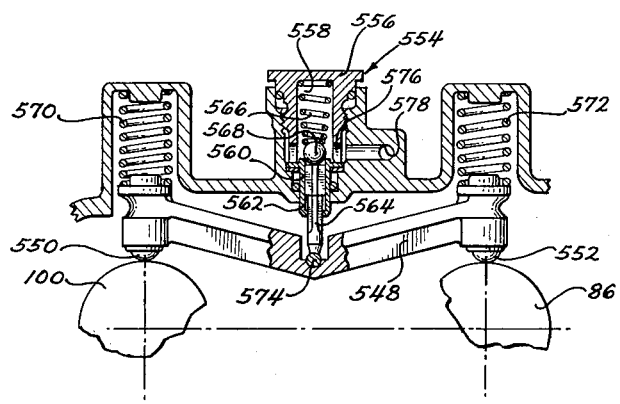
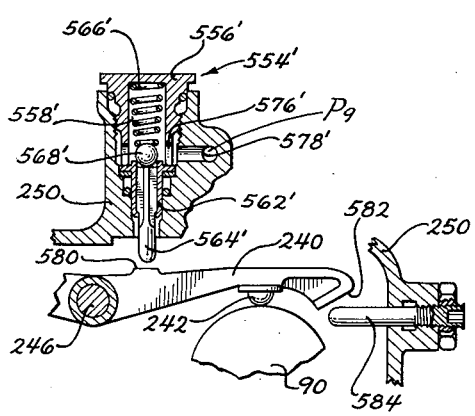
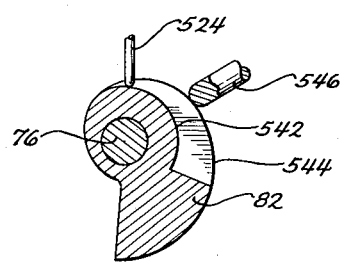

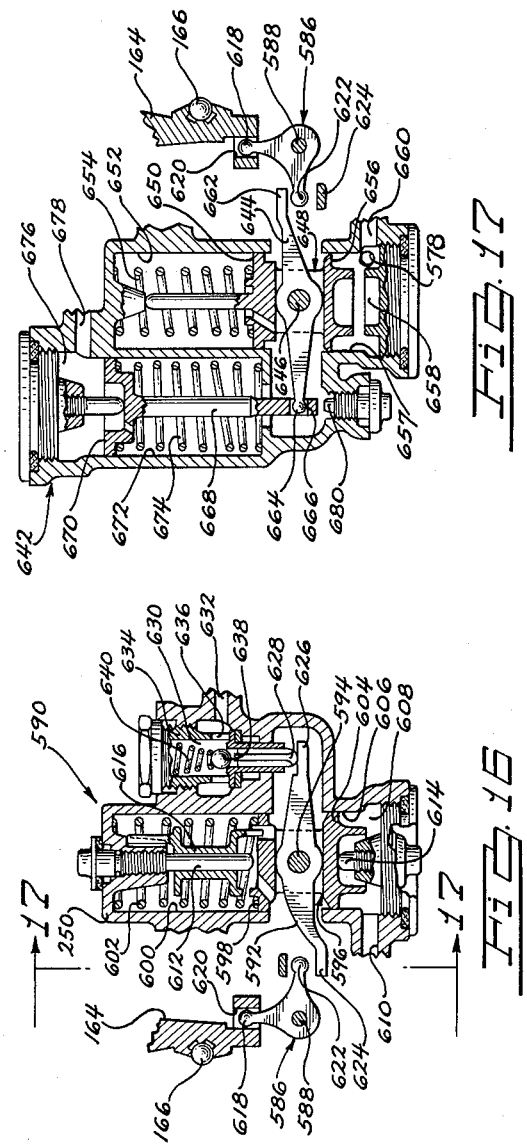

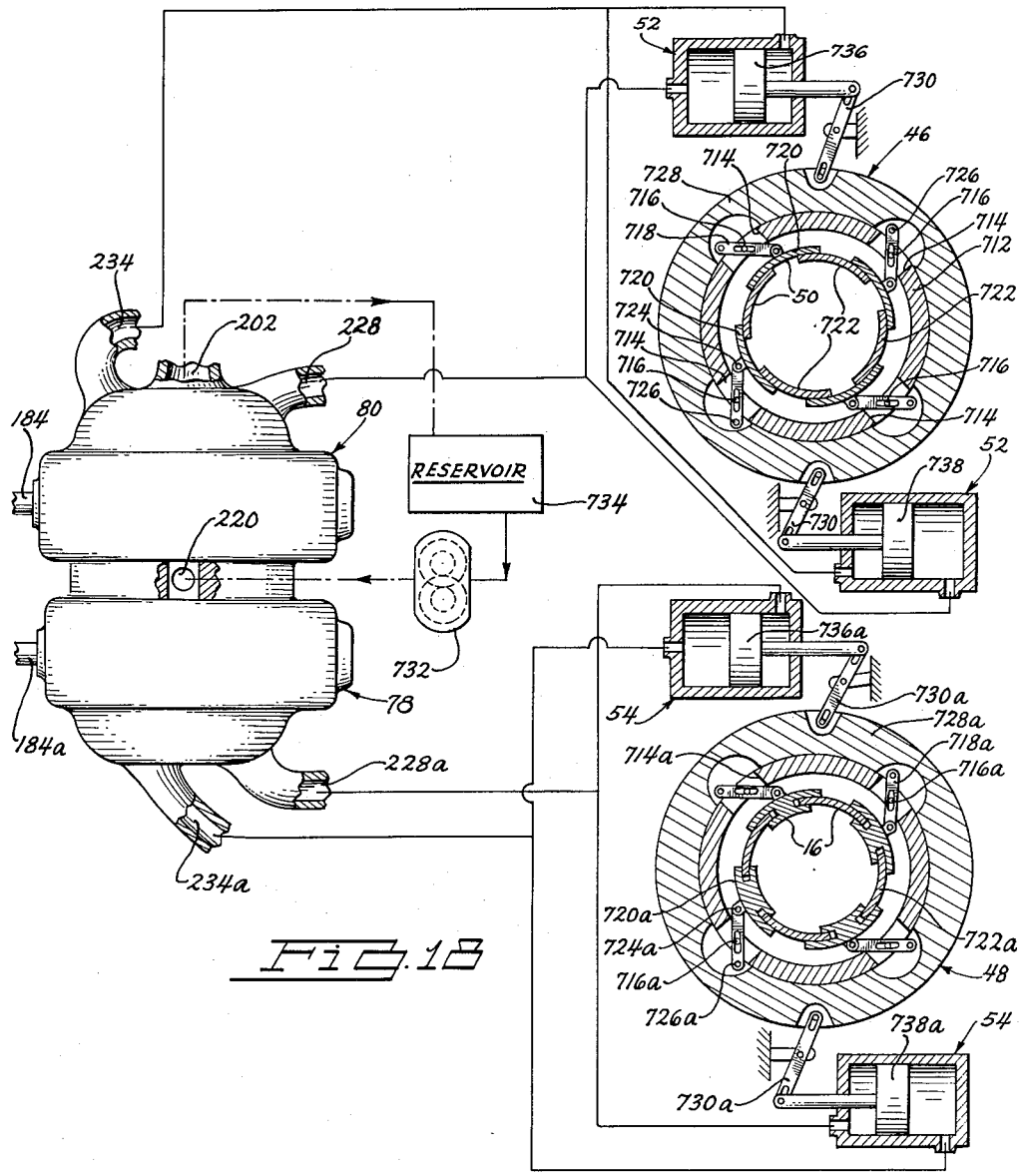

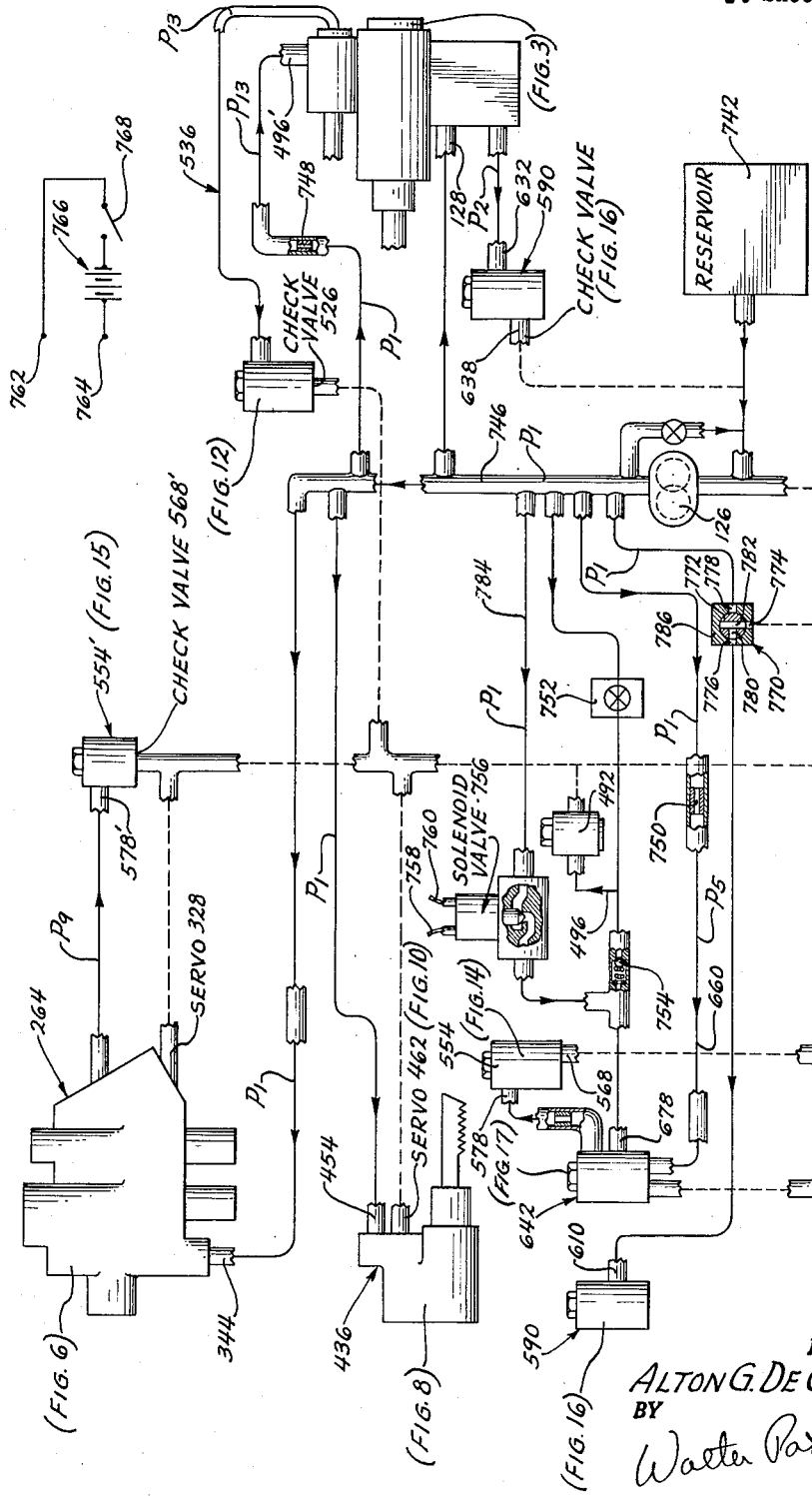

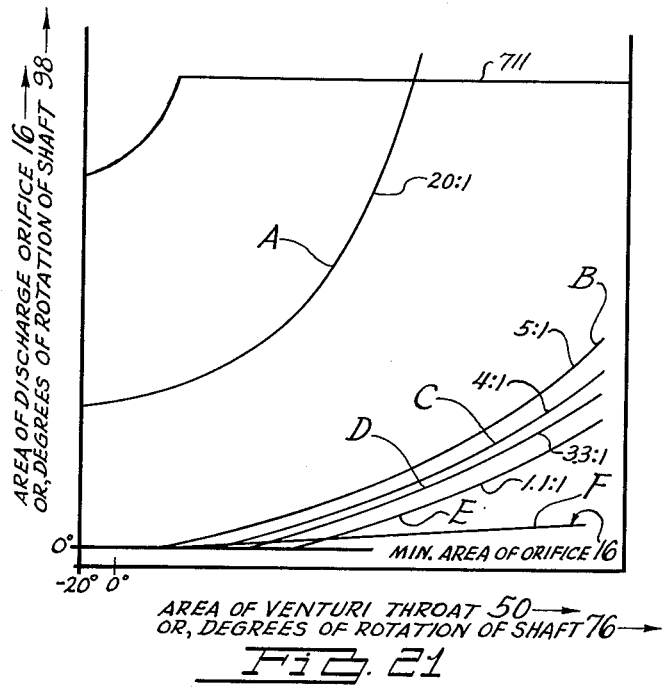
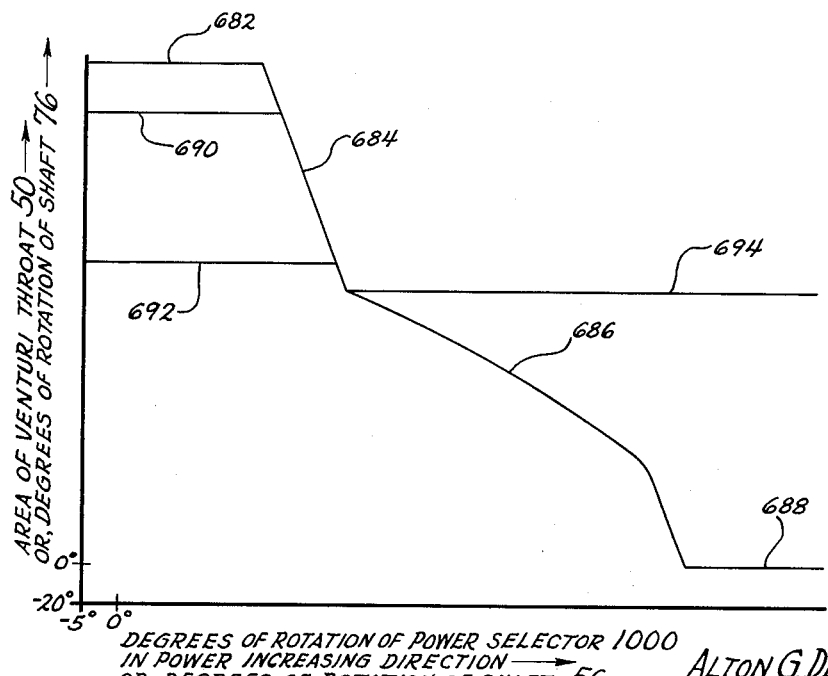

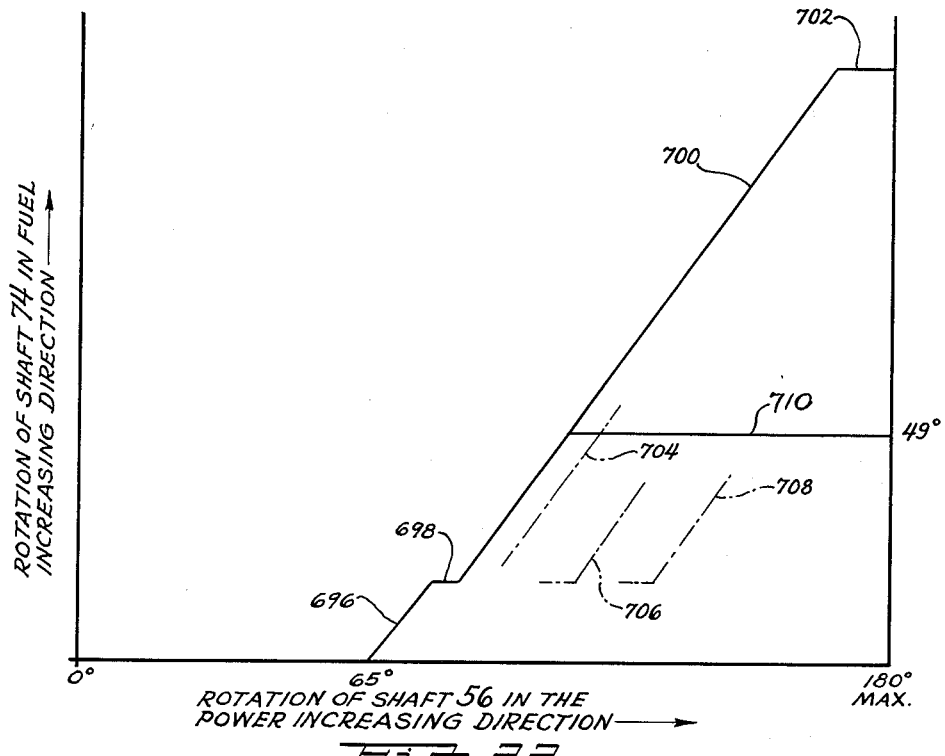
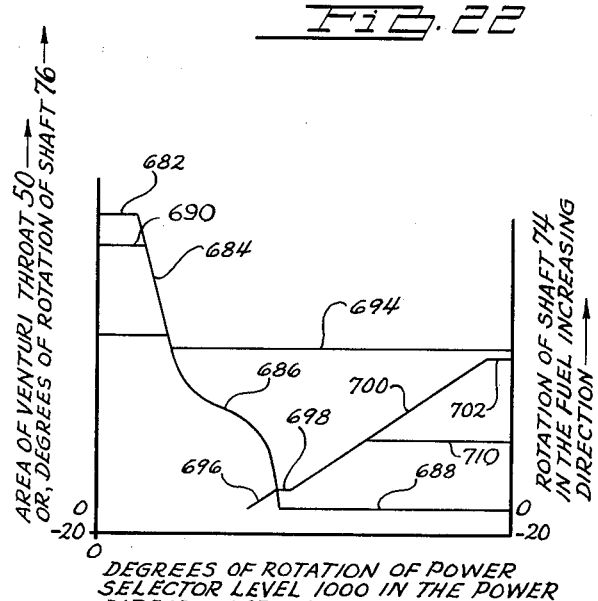

United States Patent Office 3,137,996
Patented June 23, 1964

3,137,996
REACTION ENGINE CONTROL
Alton G. De Claire, Jr., St. Charles, Ill., assignor to Holley Carburetor Company, Warren, Mich., a corporation of Michigan
Filed Feb. 23, 1961, Ser. No. 90,983
9 Claims. (Cl. 60—35.6)

This invention relates to aircraft engines wherein the propulsive force is obtained by greatly increasing the velocity of a relatively small mass of air as compared to the conventional piston engine employing a propeller. Such engines may be of the following types: (1) Turbojet, (2) Turboprop, (3) Turbofan, (4) Turboshaft, (5) Ramjet or (6) Rocket.

More specifically, this invention is concerned with any engine which utilizes an exhaust outlet cone or nozzle as at least a partial determining factor in the overall propulsive force of the engine.

Still more specifically, the invention relates to control means, associated with the above defined engines, for varying the areas of an exhaust cone or nozzle.

In the past it has been found that better engine efficiencies were obtainable by varying the area of the tail cone discharge orifice so as to provide optimum nozzle sizes for all engine operating conditions. In various embodiments of this general type of structure, the nozzle area was varied in accordance with such parameters as for example, power lever angle, ambient temperature and pressure and engine speed.

However, it has been found that even though this type of control is more efficient than possibly a jet engine provided with a fixed nozzle area, still greater efficiencies are possible if the tail pipe can be formed so as to provide a convergent-divergent throat having a shape resembling a venturi in order to closely approximate the flow pattern of the exhaust gases. In addition to forming the shape generally into a venturi, still greater efficiencies are obtainable by varying the sizes of the throat and discharge orifice, relative to each other, and with respect to selected engine operating parameters. By so shaping the tail pipe and regulating the respective orifices, substantially all power losses resulting from such undesirable characteristics as eddy currents are eliminated.

In order to accomplish this, it is of course apparent that two variable areas within the tail pipe are required.

Accordingly, it is an object of this invention to provide control means for varying the areas of the two orifices.

More specifically, it is an object of this invention to provide automatic control means for varying the respective orifice sizes in relation to each other and to certain engine operating parameters.

Other objects and advantages will become more apparent when reference is made to the specification as follows and the list of illustrations wherein:

FIGURE 2 is a perspective view of some of the major subassemblies comprising the invention;

FIGURE 3 is a cross-sectional view taken on the plane of line 3—3 of FIGURE 2, looking in the direction of the arrows;

FIGURE 4 is a fragmentary cross-sectional view taken on the plane of line 4—4 of FIGURE 2 and looking in the direction of the arrows;

FIGURE 5 is a fragmentary view taken on the plane of line 5—5 of FIGURE 4 and looking in the direction of the arrows;

FIGURE 6 is a cross-sectional view taken on the plane of line 6—6 of FIGURE 2, looking in the direction of the arrows;

FIGURE 8 is a fragmentary view in cross-section taken on the plane of line 8—8 of FIGURE 2, looking in the direction of the arrows;

FIGURE 9 is a fragmentary cross-sectional view taken on the plane of line 9—9 of FIGURE 2 looking in the direction of the arrows;

FIGURE 11 is a fragmentary elevational view taken in the direction of arrow A of FIGURE 2;

FIGURE 12 is a fragmentary view in cross-section taken on line 12—12 of FIGURE 11;

FIGURE 13 is a cross-sectional view taken on line 13—13 of FIGURE 12 and looking in the direction of the arrows;

FIGURE 14 is a fragmentary view with portions thereof in cross-section, taken on the plane of line 14—14 of FIGURE 11 and looking in the direction of the arrows;

FIGURE 15 is a fragmentary cross-sectional view taken on the plane of line 15—15 of FIGURE 4 and looking in the direction of the arrows;

FIGURE 16 is a fragmentary cross-sectional view illustrating a hydraulically responsive limiting device;

FIGURE 17 is a fragmentary cross-sectional view taken generally on line 17—17 of FIGURE 16 and looking in the direction of the arrows of a second hydraulically responsive limiting device;

FIGURE 18 is a fragmentary cross-sectional view illustrating in generally schematic relationship the throat and discharge orifices of the turbine engine along with their hydraulic actuator;

FIGURE 19 is a schematic diagram of the hydraulic circuitry within the invention along with some of the major subassemblies in communication therewith;

FIGURE 20 is a graph illustrating the relationship between the position of the power selector lever and the area of the throat orifice;

FIGURE 21 is a graph illustrating the relationship between the areas of the throat and discharge orifices for varying pressure ratios of turbine discharge pressure to atmospheric pressure;

FIGURE 22 is a graph illustrating the relationship between the position of the power selector lever and the request signal to the afterburner fuel control;

FIGURE 23 is a composite graph illustrating the combined graphs of both FIGURES 20 and 22.

Figure 1:
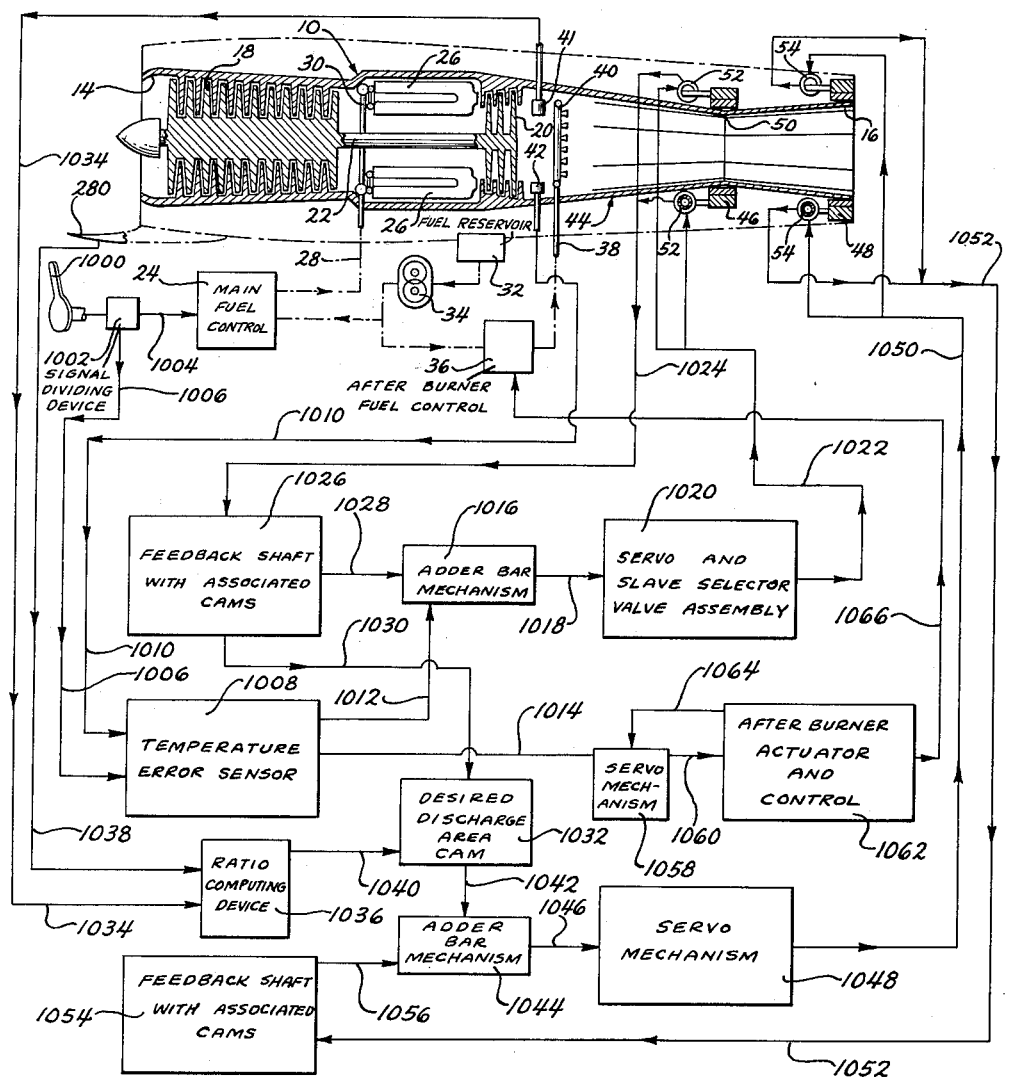
FIGURE 1 is a schematic block diagram of the invention as associated with, for example, a turbojet engine.

Referring more specifically to the drawings, FIGURE 1 illustrates generally an engine 10 equipped with the jet nozzle area control 12, and having an air inlet 14 and exhaust nozzle discharge orifice 16. A compressor 18 is connected to turbine 20 by means of shaft 22. A primary fuel control 24 supplies fuel to the burner 26 by means of a conduit 28 and burner ring 30. A fuel reservoir 32 supplies a pump 34 which not only supplies the primary fuel control 24 but also the afterburner fuel control 36. The afterburner fuel control supplies fuel downstream of the turbines 20 by means of conduit 38 and burner ring 40, a temperature probe 42 may be provided posterior to the turbines 20. The afterburner section 44 is comprised of members 46 and 48 which combine together to form a convergent-divergent shape. The throat diameter 50 is controlled by member 46 whereas the discharge area 16 is determined by member 48. A plurality of hydraulically actuated cylinders 52 and 54 cooperate with members 46 and 48 respectively so as to provide power thereto.

FIGURE 2 illustrates in greater detail some of the major components within the control 12. The input shaft 56 is illustrated as having mounted thereon a second tubular member 58 which is adapted to be angularly positioned in accordance with shaft 56 between which is varied to have axial movement with respect thereto. A cam member 60 is secured to shaft 58 as is cam 62.

A third cam member 64 is also secured to tubular portion 58 and is adapted to be adjusted both axially and angularly with portion 58. The hydraulic slave piston assembly 66 is operatively connected to tubular portion 58 so as to impart thereto axial motion.

In addition to the various subassemblies provided to control the orifice areas of throat 50 and discharge orifice 16 an afterburner fuel control actuator is also provided. The actuator is comprised substantially of a hydraulically positioned piston assembly 68 which, through means of a rack 70 and cooperating gear 72, positions a shaft 74 to ultimately determine the rate of fuel flow through the afterburner fuel control 36. In view of the above it is evident that the fuel flow to the afterburner is a function of the position of the power selector lever 1000 and it will become evident later that it is also a function of temperature and the area of throat 50. A shaft 76 which controls the position of hydraulic cylinders 52 and 54 by means of valves 78 and 80 has mounted thereon cam members 82, 84 and 86. A gear 88 is used to rotate an electrical transducer whose electrical output is used as the indication of the area of throat 50. A fourth cam member 90, is slidably mounted on shaft 76 and is adapted to be positioned angularly thereby. Hydraulically responsive members 92 and 94 comprise a force balance system 96 which determines the axial position of cam 90 with respect to shaft 76, while the angular position of shaft 76 is determined generally by the feed back signal from the orifice control member 46. Shaft 98 is similar to shaft 76 in that its angular position is determined through a mechanical feed back signal from the member 48 which determined the area of discharge orifice 16. Shaft 98 contains cams 100 and 102 the functions of which will be discussed later.

In FIGURE 3 shaft 56 is illustrated as having two enlarged diameter portions 104 and 106 which serve to pilot tubular member 58 thereon. A key slot 108 provided within shaft 56 is adapted to slidably receive a key or pin 110 therein so as to allow axial movement and yet restrict angular movement between shaft 56 and tubular portion 58. One end of tubular member 58 is opened so as to receive shaft 56 while the other end 112 is secured to a hydraulic piston 114 as by threaded member 116. The cylindrical chamber 118 which slidably receives piston 114 is divided into two general chambers 120 and 122 of which 122 is the smaller.

An electric torque motor 124 of conventional design and well known in the art (see Control Engineering, August 1958, pp. 74 and 90) is secured in the general housing and modified in a manner so as to provide a servo valve 154 which is operative with a coacting seat and orifice 152 to control the flow of hydraulic fluid through the conduit 150. The torque motor 124 is responsive to an electrical signal which in turn is a function of the temperature as sensed by probe 42.

A source of high pressure hydraulic fluid as schematically illustrated at 126 supplies fluid at some relatively high pressure $P_1$ to conduit 128 which in turn supplies three branch conduits two of which contain restrictions therein. Conduit 132, having a conventional restriction 142 therein communicates between the high pressure conduit 128 and chamber 120, while conduit 130 which contains a laminar flow restriction 138 communicates between the high pressure conduit 128 and chamber 122.

Two pistons 140 and 148, which may have equal effective areas, are received by cylindrical cavities 146 and 136 respectively. Projections 141 and 149, which may either be secured to or formed as an integral part of pistons 140 and 148, respectively, normally bear against opposite sides of torque lever 156 which has secured thereto, by means of pivot 158, servo valve 154. The torque lever 156 is suitably pivoted at some point 160 intermediate of its ends so as to rotate in either direction about the pivot 160 in response to electrical input signals to the windings 157.

High pressure $P_1$ is directed to chamber 136 by means of conduit 134 which communicates with high pressure conduit 128, while a lower pressure $P_3$ is directed to chamber 146 by means of conduit 144 which communicates with chamber 122. The outer surfaces of pistons 148 and 140 may be exposed to some reference pressure $P_4$ which might exist in the cavity 162, a part of the general cavity of the over-all control mechanism.

In order to better explain the general operation of the torque motor and piston 114, let it be assumed, for purposes of illustration, that the piston 114 has moved to the left to its further-most position. At this time, servo valve 154 will be at some null position.

When an electrical current of some magnitude is applied to the torque motor 124, a magnetic flux is created which attracts and causes the torque lever 156 to rotate clockwise about pivot 160 thereby causing servo valve 154 to raise off its seat and coacting orifice 152. Since $P_4$ is the lower pressure, the fluid in chamber 120 will flow to cavity 162 by means of conduit 150 causing the pressure $P_2$ to drop to some value approaching $P_4$. At the same time, pressure $P_3$, due to restriction 138, becomes some value which is less than $P_1$ but of sufficient magnitude to overcome the force of the diminished pressure $P_2$, thereby causing the piston 114 to move to the right.

As piston 114 so moves, the increased displacement of chamber 122 is compensated for by flow through conduit 130 and restriction 138. In order to prevent any uncontrolled speeds of piston 114, piston members 140 and 148 are provided so as to create a feedback force on servo 154 which is in opposition to that force created by torque motor 124 in response to the electrical signal. As piston 114, for example, moves to the right the then-existing pressure $P_3$ is applied to chamber 146 while a pressure $P_1$ is applied to chamber 130. By so doing the pressure differential across piston 148 is $P_3$ to $P_4$ while the differential across piston 140 is $P_1$ to $P_4$. In other words, the total differential, since both $P_3$ and $P_1$ are referenced to $P_4$, is the differential between $P_1$ to $P_3$.

Laminar flow restriction 138 is provided in order to create a pressure drop between $P_3$ and $P_1$ as a function of flow therethrough. Since flow is a function of displacement of chamber 122 and the displacement is a function of velocity of piston 114 then it becomes evident that the force exerted by pistons 140 and 148 in opposition to the torque motor 124 is a function of the velocity of piston 114.

Cam 60 in cooperation with cam 84 (see FIGURE 2 also) positions adder bar 164 by virtue of followers 166 and 168 respectively. The algebraic movement of the two followers 166 and 168 is transmitted to lever 170 by means of an extension 172 which slidably cooperates with adder bar 164 by means of aperture 174 at the center thereof. Lever 170 which is also pivotally mounted to the general housing 250 by means of a pivot pin 178 has its other end 180 in cooperative engagement with the end 182 of servo valve 184. The servo valve 184 (FIGURE 4) controls the position of a hydraulic slave selector valve which in turn controls the flow of hydraulic fluid to the actuators 52 of FIGURE 1.

FIGURE 4 is a fragmentary cross-sectional view taken on line 4—4 of FIGURE 2, looking in the direction of the arrows. The selector valve assembly 80 is substantially comprised of a housing 186 having a cylinder 188 formed therein adapted to slidably receive slave valve member 190. Valve 190 is of generally hollow cylindrical form having a cylindrical chamber 192 formed therethrough adapted to slidably receive the servo valve 184.

Chambers 194 and 196 formed generally by the housing 186 and ends 198 and 200 respectively of valve 184, are vented to a low pressure hydraulic return conduit 202 through restrictions 204 and 206.

Servo valve 184, has a land portion 208 intermediate its ends which is adapted to control the flow of high pressure hydraulic fluid through servo conduits 210 and 212. The end 214 of servo valve 184 may be biased by a spring 216 so as to cause lever 170 to urge followers 166 and 168 against cams 60 and 84 (see FIGURE 3 also).

High pressure hydraulic fluid, supplied by a suitable source, is directed to chamber 218 by means of conduit 220. Assuming now that the adder bar 164 (see FIGURE 3 also) causes lever 170 to rotate clockwise about pivot 178, it will be seen then that servo valve 184 is moved to the right allowing land portion 208 to uncover servo conduits 210 while still preventing flow through servo conduits 212. Consequently, chamber 196 which is vented to the low pressure return conduit 202 by means of restriction 206 remains at the low pressure while chamber 194 increases in pressure. The increase in chamber 194 pressure is brought about by the flow of high pressure fluid from chamber 218, through conduits 210, and the clearance between the stem of servo valve 184 and valve 190 and through ports 222 communicating with chamber 194. Even though some flow does take place through vent 204, the restrictive qualities thereof are such as to allow an appreciable pressure rise in chamber 194.

As a result of the above described pressure differential, valve 190 is caused to move to the right. As it so moves, edges 224 are opened allowing high pressure fluid to pass into annular chamber 226 and subsequently into conduit 228 which communicates with one side of the hydraulic piston assemblies 52 of FIGURE 1. At the same time, edges 230 are opened allowing communication between the low pressure return conduit 202 and annular chamber 232 which in turn communicates with conduit 234. Conduit 234 is also hydraulically connected to the hydraulic piston assemblies 52 but at an end opposite to that of conduit 228.

The valve assembly 78 is similar in all respects to the selector valve assembly 80. Even though servo valve 184a is connected to a lever other than lever 170, it, along with all other elements which are like or similar to those discussed in relation to the valve assembly 80 are identified with like reference numerals with a suffix "a." Conduits 234a and 228a, of course, communicate with hydraulic actuators 54.

The position of servo valve 184a is determined by levers 236 and 238 which are positioned in accordance with adder bar 240. Adder bar 240 is positioned by cams 90 and 102 through followers 242 and 244 respectively. Lever 238, slidably received within adder bar 240 by the cooperative action of extension 246 and aperture 248, is pivotally mounted to the general housing 250 by means of pivot 252. Any rotation of lever 238 about pivot 252 will of course cause a corresponding movement in lever 236 which is pivotally mounted to housing 250 by pivot 254.

FIGURE 5 illustrates lever 236 as having one end 256 in engagement with end 258 of lever 238 while its other end 260 is operatively connected to end 262 of servo valve 184a.

FIGURE 6, a fragmentary cross-sectional view, illustrates in greater detail the ratio computing device 264 comprising piston assemblies 92 and 94 of FIGURE 2 employed for computing the ratio of pressures between the turbine discharge pressure, $P_{t5}$, and atmospheric pressure $P_0$. The computing device then, in accordance with the computed ratio, creates an output which is transmitted to cam 90 (see FIGURES 2 and 4 also).

The entire computing device is illustrated as being comprised of three generally distinct subassemblies, namely, the atomspheric pressure signal receiving portion 266, the turbine discharge pressure signal receiving portion 268, and the computer portion 270.

The atmospheric pressure receiving portion 266 is further comprised of a conventional synchro-transformer 272 which receives an impressed voltage from some other remote signal producing device, an electronic amplifier 274, and an electric torque motor 276 which ultimately changes the electrical energy to a hydraulic force. The internal construction and operation of the above electrical devices are well known in the art.

A signal voltage produced by some remote device 278 in accordance with the atmospheric pressure as sensed by probe 280, is impressed on the input leads 282, 284 and 286 of the synchro-transformer 272 and is then transmitted to the electronic amplifier 274, as by the electrical connections 288 and 290. The voltage is then amplified some sufficient degree and directed to the electric torque motor 276 as by leads 292, 294 and 296. The electric torque motor 276 then rotates servo valve member 298, as for example clockwise, thereby creating a hydraulic force. The operation of the atmospheric pressure signal receiving portion will be more fully explained subsequently in the discussion.

The turbine discharge pressure signal receiving portion 268 is comprised generally of a housing portion 300 having therein an evacuated bellows 302 and a second pneumatic pressure receiving bellows 304. Adapter members 306 and 308 are received by the free ends of bellows 302 and 304, respectively, in a manner so as to provide an opening 310 through which a pivotally mounted lever 312 is received. A yoke-type linkage 314 is connected to lever 312 so as to be responsive to all movements of the bellows 302 and 304 and the lever 312.

The turbine discharge pressure $P_{t5}$, sensed by probe 316 is directed by any suitable conduitry 318 to the interior of bellows 304 as by conduit 320 and orifices 322. As the turbine discharge pressure increases, lever 312 will be rotated counter-clockwise and linkage 314 will be moved to the left, causing lever 324 to rotate counter-clockwise about pivot 326. Valve 328, secured to the free end of lever 324, is thereby moved some distance away from its coacting seat so as to create a hydraulic pressure, as will be more fully explained subsequently.

The computer portion 270 is comprised generally of two multiple diameter pistons 330 and 332. Piston 330 is received in a cylindrical chamber 334 and, by virtue of its largest diameter 336, divides the cylinder into two variable and distinct chambers 338 and 340. The piston 330 has two different effective diameters 336 and 342 which in turn provide different projected areas exposed to two different pressures. One end of chamber 334 has an opening therein which is adapted to slidably receive the smaller diameter 342 of the piston 330 and allow the piston to respond to variations in pressures which exist in both chambers 338 and 340. The proposed structure employs a hydraulic system in order to provide these different pressures. Piston 332 is basically similar to piston 330 and all like or similar portions thereof are identified with primed numerals.

The general housing 250 also provides suitable conduitry for communication of the various hydraulic pressures. Conduit 344 communicates between a source of relatively high pressure hydraulic fluid indicated generally at 126 and has three branch conduits 348 and 350 and 352. Conduit 352 which contains a conventional restriction 354 therein communicates between the high pressure conduit 344 and chamber 338 while conduit 350 which contains a laminar flow restriction 356 therein communicates between the high pressure conduit 344 and chamber 340.

Two pistons 358 and 360, which may have equal effective areas, are received by cylindrical cavities 362 and 364 respectively. Projections 366 and 368, which may either be secured to or formed as an integral part of pistons 362 and 364, respectively, normally bear against opposite sides of torque motor lever 370 which has secured thereto, by means of pivot 372, servo valve 298. The torque lever 370 is suitably pivoted at some point 376 intermediate of its ends so as to rotate in either direction about the pivot 376 in response to electrical input signals on windings 378.

High pressure $P_1$ is directed to chamber 364 by means of conduit 348 which communicates with high pressure conduit 344, while a lower pressure $P_7$ is directed to chamber 362 by means of conduit 380 which communicates with chamber 334. The outer surfaces of pistons 358 and 360 may be exposed to some reference pressure $P_8$ which might exist in the cavity 382, a part of the general cavity of the over-all control mechanism.

When an electrical current of some magnitude is applied to the torque motor 276, a magnetic flux is created which attracts and causes the torque lever 370 to rotate clockwise about pivot 376 thereby causing servo valve 298 to move off its seat and coacting orifice 384. Since $P_8$ is the lowest pressure, the fluid in chamber 338 will flow to cavity 382 by means of conduit 386 causing the pressure $P_6$ to drop to some value approaching $P_8$. At the same time pressure $P_7$, due to restriction 356, becomes some value which is less than $P_1$ but of sufficient magnitude to overcome the force of the diminished pressure $P_6$, thereby causing the piston 330 to move upwardly.

As piston 330 so moves, the increased displacement of chamber 340 is compensated for by flow through conduit 350 and restriction 356. In order to prevent any uncontrolled speeds of piston 330, piston members 358 and 360 are provided so as to create a feedback force on servo 298 which is in opposition to that force created by torque motor 276 in response to the electrical signal. As piston 330, for example, moves upwardly the then-existing pressure $P_7$ is applied to chamber 362 while a pressure $P_1$ is applied to chamber 364. By so doing the pressure differential across piston 358 is $P_7$ to $P_8$ while the differential across piston 360 is $P_1$ to $P_8$. In other words, the total differential, since both $P_7$ and $P_1$ are references to $P_8$ is the differential between $P_1$ and $P_7$.

Laminar flow restriction 356 is provided in order to create a pressure drop between $P_7$ and $P_1$ as a function of flow therethrough. Since flow is a function of displacement and the displacement of chamber 334 is a function of velocity of piston 330 then it becomes evident that the force exerted by pistons 358 and 360 in opposition to the torque motor 276 is a function of the velocity of piston 330.

Communication between chambers 334 and 334′ is accomplished by the provision of a conduit 390. A branch conduit 392, having a restriction 394 therein, communicates between chamber 338′ and conduit 390. Conduit 396 is in controlled communication with the general cavity by means of a pivotally supported valve 328. A balancing pin 398 may be provided to offset any transient forces produced by the relatively high pressure in the servo conduit 396. An additional conduit 578 communicates between conduit 396 and a normally closed valve member 554′ of FIGURE 15.

A generally U shaped leaf type spring 400 is pivotally supported, as by pin 402, within piston 330 and has rollers 404 and 406 secured to the free ends thereof. A rod member 408, also pivotally supported at one end within piston 330, has a gear rack 410 formed at its other end. The rack is adapted to coact with a gear 412 which determines the position of some of the electrical elements within the synchro-transformer 272. The movement of roller 404 to the left is continually restricted by a positive abutment 414, whereas the movement of roller 406 to the right is resiliently restricted by a pivotally supported rail 416.

Piston 332 has a pivotally supported projection 418 which appears to be similar to the leaf spring 400. However, the rollers 420 and 422, which are secured to the free end of projection 418, are maintained in a constant relationship to each other by means of a restraining linkage 424 connecting both to each other. As a result of this linkage 424, no spring force influences the relative positions of rollers 420 and 422. A rod 426 pivotally mounted at one end 428 to piston 332 has its other end received by cam member 90, and it is adapted to move the cam member axially upon shaft 76 in accordance with the position of piston 332. The cam 90 is provided with a key slot 430 which is adapted to slidably receive a key member 432 secured in shaft 76 so as to allow axial motion as between the cam 90 and shaft 76.

For purposes of illustration, let it be assumed that the system as disclosed in FIGURE 6 is at equilibrium and that there is some flow past valves 298 and 328. At this time, there will be a certain value for $P_{t5}$, the turbine discharge pressure, and the impressed voltage on leads 282, 284 and 286.

Now let it be further assumed that the voltage signal to the synchro-transformer is increased. After the electronic amplifier 274 raises the signal to a working level, it is directed to the electric torque motor 20 which responds by rotating the valve, for example, counter-clockwise. As the valve 298 moves closer to its seat, the pressure $P_6$ in conduit 386 and chamber 338 increases tending to approach the pressure $P_5$ which exists in conduit 344 as a limit.

The increase in pressure $P_6$ causes piston 330 to move downwardly and as it so moves, the rack 410 is moved correspondingly so as to rotate gear 412. The rotation of gear 412 causes like rotation of some elements within the synchro-transformer; as these elements are rotated, they tend to progressively diminish the magnitude of the signal voltage which is conveyed to the electronic amplifier 274. The effect of this rotation by rack 410 is to indicate to the synchro-transformer and torque motor, that the piston 330 has been moved a sufficient and proper amount in response to the last increase in signal voltage.

Additionally, as piston 330 moves downwardly, the rollers 404 and 406 which are secured to the piston through the leaf spring 400 are also moved downwardly. As the rollers so move, the force of spring 400 which tends to move the rollers away from each other causes the rollers 404 and 406 to bear against the abutment 414 and rail 416 respectively. As a result of the downward movement of these rollers, an increased torque is imposed on rail 416 about its pivot 432, causing a greater force to be transmitted through rollers 420 and 422 and linkage 424. Since the linkage 424 prevents any spring action to take place as between the rollers 420 and 422, the increased force is applied directly to the lever 324.

Assuming now that the pressure $P_{t5}$ has remained constant, the increased force applied to lever 324 will cause the lever to rotate clockwise about its pivot 326, consequently causing the valve 328 to move closer to its coacting seat. The added restriction to flow past valve 328 causes the pressure $P_9$ in conduit 396, and chamber 338′ to increase to some value tending to approach $P_7$. The resulting action is similar to that described previously in conjunction with piston 330, in that piston 332 is moved downwardly. The movement of piston 332 and rollers 420 and 422 continues until the torque applied to lever 324 is diminished sufficiently to enable the force transmitted by linkage 314, due to $P_{t5}$, to return and/or stabilize the movement of lever 324 and valve 328 so as to place it in a null position again. Of course, the movement of piston 332 ultimately positions cam 90 axially with respect to shaft 76.

Figure 7:
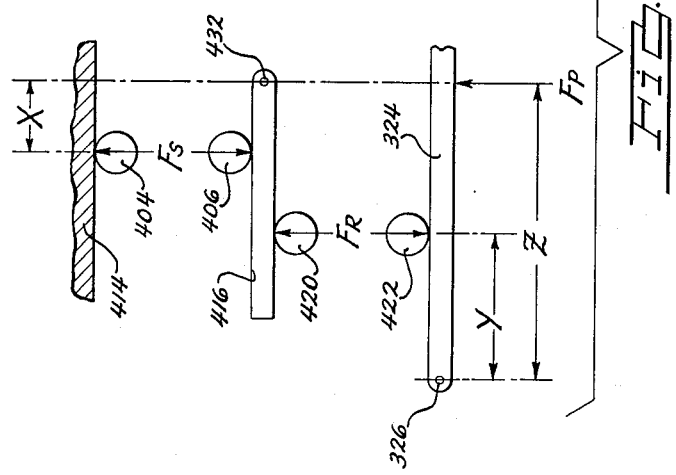
FIGURE 7 is a view schematically illustrating the force balance system of the device illustrated in FIGURE 6.

From the previous discussion, it is apparent that the movement of piston 330 is a function of the atmospheric pressure signal as sensed at 280. Referring now to FIGURE 7, this movement is represented by "X" designating the distance that the rollers 404 and 406 are away from pivot 432.

Whenever the system is in equilibrium, it is apparent that:

(1) $$Fs(X) = Fr(Z-Y)$$

From an inspection of both FIGURES 6 and 7, however it is seen that:

(2) $$Fr(Y) = [P_{t5}(A_B)][Z]$$

where:

$A_B$ = effective area of the bellows 304,
Therefore, substituting Equation #2 into Equation No. 1:

(3) $$F_s(X) = \left[\frac{P_{t5}(A_B)Z}{Y}\right]\left[Z-Y\right]$$

and cross multiplying and cross dividing:

(4) $$Y = \left[\frac{P_{t5}(A_B)Z}{Fs(X)}\right]\left[Z-Y\right]$$

and expanding:

(5) $$Y = \frac{P_{t5}(A_B)Z^2}{Fs(X)} - \frac{P_{t5}(A_B)ZY}{Fs(X)}$$

and transposing and factoring:

(6) $$[Y]\left[1+\frac{P_{t5}(A_B)Z}{Fs(X)}\right] = \frac{P_{t5}(A_B)Z^2}{Fs(X)}$$

As previously stated, X is some function of the electrical signal, which in turn is a function of the ambient pressure, $P_0$, which is sensed by pressure probe 280. The pressure probe may operate in conjunction with some converting device 278 which is capable of converting a pressure sense into elecetrical signals for purposes of transmission to the lead 282, 284, and 286 of the synchro-transformer 272.

In view of this, it can be seen then that:

(7) $$X = K_1(P_0)$$

where:

$K_1$ in some constant of proportionality. Therefore, dividing both sides of Equation No. 6 and substituting Equation No. 7 therein:

(8) $$Y = \frac{\left[\frac{P_{t5}(A_B)Z^2}{FsK_1(P_0)}\right]}{\left[1+\frac{P_{t5}(A_B)Z}{FsK_1(P_0)}\right]}$$

where:

$A_B$, Z, Fs and $K_1$ are all constants.
Therefore:

(9) $$K_2 = \frac{(A_B)Z}{FsK_1}$$

Substituting Equation No. 9 into Equation No. 8, it can be seen that the movement of the piston 332, or its position at any time is:

(10) $$Y = \frac{\left[\frac{P_{t5}}{(P_0)}\right][K_2Z]}{1+\left\{\left[\frac{P_{t5}}{(P_0)}\right][K_2]\right\}}$$

In view of both Equations Nos. 9 and 10, it can be appreciated that it is most desirable to maintain the force of spring 400 as constant as possible. Realizing that operation of the over-all control, in which the invention may be embodied, may result in temperature variations of the surrounding medium, provision can be made to compensate for any loss in spring force due to changes in spring rate.

This temperature compensation can be accomplished by the use of a temperature responsive bimetallic spring 434 secured to the leaf spring 400. By this arrangement, the spring force that is lost in spring 400 by the change in spring rate can be thermostatically compensated by the bimetal 434.

FIGURE 8, is a cross-sectional view of the afterburner actuator and control 436 taken on line 8—8 of FIGURE 2. The general purpose of the actuator 436 is to regulate the fuel flow through the afterburner fuel control 36 (see FIGURE 1) in accordance with input signals on shaft 56 and torque motor 124 (see FIGURE 3).

Figure 10:
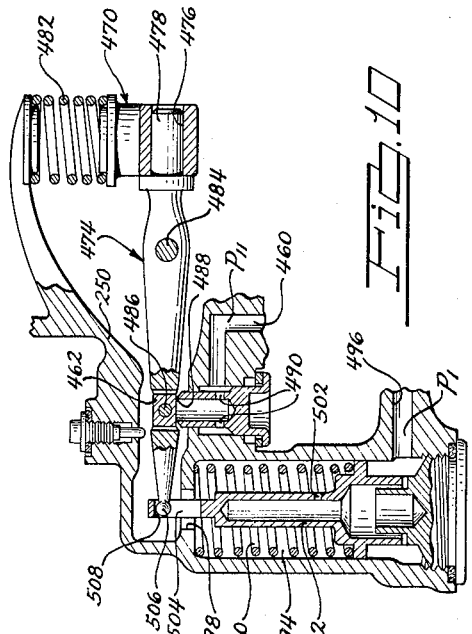
FIGURE 10 is a fragmentary cross-sectional view taken on the plane of line 10—10 of FIGURE 9, looking in the direction of the arrows.

The actuator 436 is substantially comprised of a housing 438 adapted to slidably receive a pressure responsive piston 440 to which a rack 442 is secured as by a pivot member 444. The pressure responsive piston 440, by means of its larger diameter 446, divides the general cavity into two variable and distinct chambers 448 and 450. A suitable source 126 supplies high pressure fluid at some pressure $P_{10}$ to conduit 454 and chamber 450 by means of conduit 456. Restriction 458, received in conduit 454 downstream of conduit 456, causes a pressure drop resulting in a pressure $P_{11}$ in chamber 448. Conduit 460, which is hydraulically connected with chamber 448 by means of conduit 454, is also at a pressure $P_{11}$ and communicates with a servo valve 462 as illustrated in FIGURE 10.

The servo valve 462 is functionally operative to control the position of piston 440. As the piston moves in either direction the rack 442 connected thereto, causes a rotation of coacting gear 72 thereby positioning the shaft 74 which in turn regulates the afterburner fuel control 36 by means of a suitable transmission 1066 (see FIGURE 1).

A cam member 466 is also fixedly secured to shaft 74 so as to rotate in accordance therewith. As the gear 72 is rotated, the cam 466 causes a displacement of follower 468 which is indicative of the position of shaft 74 and gear 72. This displacement is used to cancel out the previous request signal given to the servo valve 462 as will be subsequently more fully explained.

FIGURE 9 illustrates the relative arrangement of the cam 466 with respect to the shafts 56, 76 and 98. Adder bar 470 having followers 468 and 472 at its opposite ends in cooperative engagement with cams 466 and 64, respectively, is adapted to slidably receive a servo valve lever 474 by means of an aperture 476 and extension 478. Springs 480 and 482 may be provided as illustrated in order to bias the followers against their respective coacting cams.

FIGURE 10, a fragmentary cross-sectional view taken on the plane of line 10—10 of FIGURE 9 and looking in the direction of the arrows, illustrates in greater detail the servo valve lever 474 and the servo valve 462.

Referring to both FIGURES 9 and 10, it can be seen that as follower 472 of lever 470 is lowered as by the action of cam 64, that the lever 470 pivots about follower 468 in a clockwise direction so as to lower projection 478. Since the servo lever 474 is pivoted to the general housing 250 by means of a pivot member 484, the described movement of projection 478 causes clockwise rotation of lever 474 about pivot 484 thereby moving servo valve 462, which is pivotally mounted to lever 474 as by a pivot member 486, further away from its coacting servo seat and orifice 488.

As servo valve 462 moves further away, greater flow of fluid is permitted through conduit 460 (see FIGURE 8 also) and orifices 490 thereby reducing the pressure $P_{11}$ in chamber 448 of FIGURE 8. As pressure $P_{11}$ is so reduced, piston 440 is caused to move to the left thereby positioning both the shaft 74 and cam 466. Such movement of piston 440 will of course continue until the increment of movement of follower 468 as caused by cam 466 is sufficient to cancel out the previous increment of movement of follower 472 as originally caused by cam 64. This will then result in the servo valve 462 returning to a null position and thereby stabilize the piston 440.

FIGURE 10 also illustrates a pressure responsive limiting piston 492 which is slidably received in a chamber 494. One end of the chamber 494 is in communication with a conduit 496 which at times supplies a high pressure fluid $P_1$ thereto. The other end of chamber 494 is in communication, as by means of a relatively large orifice 498, with the relatively low reference pressure existing in the general cavity of the over-all housing 250. Whenever high pressure $P_1$ is directed through conduit 496 to chamber 494, piston 492 is caused to move upwardly. Upon termination of the high pressure, the spring 500 urges the piston downwardly and the restricted bleed orifice 502 allows the pressures on opposite sides of the piston to reach a common level.

A slot 504 formed in one end of the piston member 492 is adapted to slidably receive the otherwise free end 506 of lever 474. Whenever the piston 492 is forced downwardly by spring 500, as described above, the slot 504 is lowered thereby limiting the degree to which lever 474 can move clockwise about pivot 484 and consequently causing servo valve 462 to close off servo orifice 488. This of course is accomplished by having end 506 abut against surface 508 of slot 504.

Referring again to FIGURE 3 it can be seen that a piston 510, similar in every respect to piston 492 of FIGURE 10, is provided in order to at times limit the travel of follower 472. All elements which are like or similar to those of FIGURE 10 are identified with like primed reference numbers. Conduit 496' as conduit 496, at times supplies a high pressure $P_{13}$ fluid to chamber 494'. A lever 512, having arm portions 514 and 516 and pivoted intermediate its ends by a pivot member 518, is adapted to coact with piston 510 in a manner so as to limit the downward travel of follower 472. For example, whenever spring 500' moves piston 510 to the right, arm portion 514 abuts against surface 520 causing the lever 512 to rotate clockwise about pivot 518. Consequently, arm portion 516 is brought to either bear against or interpose itself in the path of movement of follower 472 as it moves down the cam member 64. Accordingly, whenever the high pressure fluid $P_{13}$ is directed to chamber 494', the piston 510 is moved to the left and arm portion 516 ceases to function as a limiting abutment.

As illustrated by FIGURE 12, cam 82, in addition to positioning a transducer 522, also positions member 524 which in turn is adapted to at times raise the ball check valve 526 off its coacting seat 528. A spring 530, may be provided in order to insure proper seating of the ball valve 526. Normally, chamber 532 which contains spring 530 and check valve 526, is at a relatively high pressure by virtue of its connection with a source of high fluid pressure as by means of radially formed passages 534 and conduit 536. However, when member 524 is sufficiently raised by the action of cam 82, the ball valve 526 is lifted off its seat allowing the high pressure fluid to drain from chamber 532 through the fluted passages of member 524 and into the general cavity of the control which is at some relatively low and constant reference pressure.

A synchro-transformer 538 is provided with a gear 540 which is adapted to be in constant mesh with gear 88. The synchro-transformer 538 may be provided in order to produce an electrical signal which in turn may control visual gauges within the pilot's compartment.

Referring to FIGURE 13, it can be seen that cam 82 actually provides two separate and distinct cam surfaces 542 and 544. Cam surface 542 is achieved by a centrally formed slot within the cam member 82 while cam surface 544 is the outer periphery of the member 82. In this manner cams for two different follower members can be provided within the same general cam body. That is, follower member 524 is positioned in accordance with cam surface 542 while the position of follower 546 of transducer 522 is determined by the contour of cam surface 544.

FIGURE 14 illustrates an adder bar 548 adapted to at times open a check valve assembly 554 in accordance with the position of its followers 550 and 552 as determined by cams 100 and 86, respectively.

The check valve assembly 554 is substantially comprised of a plug member 556 externally threaded so as to be engageable with the general housing 250 and having a chamber 558 formed therein. A valve seat member 560 having a tubular-like extension 562 adapted to slidably receive a fluted actuating member 564, is rigidly secured in position by the cooperative action of housing 250 and plug member 556. A spring 566 is provided in order to insure proper seating of the ball check valve 568 on the seat member 560.

Suitable guide members, not shown, may be provided in order to maintain adder bar 548 in its proper position with respect to cams 100 and 86. Springs 570 and 572 are of course used to urge the followers 550 and 552 against their respective cams. A cylindrical member 574, secured to adder bar 548 intermediate of followers 550 and 552 is provided in order to eliminate any movement of member 564 due to merely the angularity of adder bar 548.

Normally, chamber 558 which contains spring 566 and check valve 568, is at a relatively high pressure by virtue of its connection with a source of high fluid pressure as by means of radially formed passages 576 and conduit 578. However, when member 564 is sufficiently raised by the action of cam 100 and/or cam 86, the ball valve 568 is lifted off its seat allowing the high pressure fluid to drain from chamber 558 through the fluted passages of member 564 and into the general cavity of the control which is at some relatively low and constant reference pressure.

FIGURE 15 illustrates in somewhat greater detail some of the elements cooperating with the adder bar 240. A check valve assembly 554', similar to the assembly 554 illustrated in FIGURE 14, is adapted to be actuated at times by the adder bar 240 by means of a raised portion 580 formed thereon. All elements of assembly 554' which are like or similar to those of assembly 554 are identified with like primed reference numerals.

Adder bar 240 has in addition to its followers 244 and 242, an angularly formed abutment 582 adapted to be moved in accordance with adder bar 240. The abutment 582 will, depending on the rise of cam 102 and/or the fall of cam 90, abut against the rigid but adjustably positioned stop member 584.

FIGURE 16 illustrates one of the hydraulically responsive devices which limits the movement of lever 586 about its pivot 588 and consequently limits the movement of the coacting follower 166 of adder bar 164 (see FIGURE 9 also). The limiting device 590 is comprised of a lever member 592 pivotally supported intermediate of its ends on a pivot member 594 which in turn is secured to a movable piston member 596. One end 598 of piston 596 is slidably received within the bore 600 which also contains a spring 602 normally biasing the piston and lever 592 downwardly. The other end 604 of piston 596 is slidably received within bore 606 and forms a wall of a general chamber 608 which communicates with conduit 610. Suitable adjustable stop members 612 and 614 are provided to limit the maximum movement of piston 596 in either direction. Additionally, a guide member 616 may also be provided in order to prevent undesirable rotation of piston 596 within its respective bores.

End 618 of lever 586 is retained by a receiving slot 620 formed in one end of adder bar 164. Accordingly, as follower 166 moves with cam 60 (FIGURE 9) end 622 of lever 586 is caused to rotate about pivot 588. However, end 624 of lever 592 is positioned so as to be generally in the path of clockwise travel of end 622, while the opposite end 626 of lever 592 is generally in contact with valve actuator 628. Therefore, if lever 586 rotates sufficiently so as to contact and rotate lever 592, member 628 and check valve 638 will be raised thereby venting the relatively high pressure of chamber 630 to the relatively low pressure of the general cavity.

Conduit 632, which communicates with a source of relatively high pressure, directs a high pressure fluid to chamber 630 of body 634 by means of radially formed passages 636. The high pressure is retained within the chamber because of the action of ball check valve 638 which is normally retained on its coacting seat by spring 640.

Conduit 610, unlike conduit 632, may be in communication with a source of either high or low pressure fluid, as will become more apparent subsequently. However, if the conduit is communicating with a source of high pressure, piston 596 and lever 592 will be raised thereby reducing the degree of rotation required by lever 586 before actuation of member 628 is accomplished.

FIGURE 17 illustrates a second limiting device 642 coacting with lever 586. The limiting device 642 is comprised of a lever 644 pivotally mounted intermediate its ends on a pivot member 646 which is, in turn, secured to piston member 648.

The piston member 648 has its one end 650 slidably received within the bore 652 which also contains spring 654 normally biasing the piston 648 downwardly. The other end 656 of piston 648 is slidably received within bore 657 and forms a wall of a general chamber 658 which communicates with conduit 660.

As previously stated, lever 586 is adapted to be rotated about pivot 588 in accordance with the position of follower 166. Lever 644, like lever 592, also has one end 662 positioned so as to be in the general path of travel of lever 586, but in a direction opposite to that controlled by lever 592. The other end 664 of lever 644 is retained by a receiving slot 666 formed in a downwardly depending portion 668 of pressure responsive piston 670 which is slidably received within bore 672. A spring 674 is also located within the bore 672 and normally urges the piston 670 and portion 668 upwardly. Chamber 676, formed generally at the top of piston 670 is in communication with conduit 678. Conduit 678, unlike conduit 660, may be in communication with a source of either high or low pressure fluid as subsequently explained in greater detail.

Generally, when high pressure is directed to chamber 676 piston 670 moves downwardly against stop member 680 causing lever 644 to rotate counter-clockwise about pivot 646 thereby allowing the greater degree of rotation of lever 586 about pivot 588. However, when the high pressure which normally exists in chamber 658 is reduced to a relatively low pressure by some extraneous device, as will be explained, spring 654 forces piston 670 and lever 644 sufficiently downwardly so as to cause a counterclockwise rotation of lever 586 about pivot 588 thereby either raising the follower 166 off cam 60 or establishing an absolute limit on the response of follower 166 to the contour of cam 60.

FIGURE 18 illustrates in cross-section the venturi orifice 50 and discharge orifice 16 with their respective hydraulically actuated piston assemblies 52 and 54.

The control mechanism 46 may be comprised of a stationary inner ring member 712 having openings 714 formed therein adapted to receive pivot members 716 about which levers 718 are at times caused to rotate. Arcuate portions 720 and 722 which may be constructed generally by slotting the exhaust nozzle 44 are arranged so as to overlap each other thereby allowing some degree of radial movement.

Levers 718, in addition to being pivotally mounted about pivot members 716, are also pivotally secured at their outer ends as by members 724 and 726 to arcuate portions 720 and an outer movable ring member 728, respectively. Ring member 728 is, in turn, connected as by levers 730 to piston assemblies 52 which act in unison to position the ring member 728.

A pump 732, supplied by a reservoir 734, delivers hydraulic fluid at a relatively high pressure to conduit 220 and servo assemblies 78 and 80 as discussed in conjunction with FIGURE 4. Accordingly, if, for example, servo assembly 80 is actuated so as to deliver such high pressure fluid through conduit 234, piston 736 will move to the left while piston 738 will move to the right. As pistons 736 and 738 so move, levers 730 are rotated counter-clockwise about their center-most pivots thereby causing outer ring member 728 to rotate clockwise. Such rotation of ring 728 in turn rotates levers 718 about pivots 716 causing portions 720 and 722 to move inwardly thereby reducing the area of the throat orifice 50. If the high pressure fluid is delivered by conduit 228 the converse is true. That is, the diameter of the throat orifice 50 increases.

Mechanism 48, which controls the size of the discharge orifice 16 may be similar to mechanism 46. Accordingly, all elements which are like or similar to those of mechanism 46 are labeled with like reference numbers with a suffix "a." If the circumstances are such as to cause high pressure hydraulic fluid to be transmitted by conduit 228a, the diameter of discharge orifice 16 will be reduced, whereas, high pressure fluid delivered by conduit 234a will cause an increase in the diameter of discharge orifice 16.

*Operation*

The general overall operation of the invention as schematically illustrated by FIGURE 1 is as follows:

The pilot selector lever 1000 is rotated and a signal is transmitted to a suitable device 1002 which divides the signal in an appropriate manner to transmissions 1004 and 1006. Transmissions 1004 and 1006 then convey the signal to the main fuel control 24 and shaft 56 with its associated cams schematically represented by 1008, respectively. A temperature signal $T_5$ as sensed by probe 42 is transmitted through a suitable transmission 1010 to the electric torque motor 124 also represented by 1008. The device schematically represented by 1008 then creates output signals on transmissions 1012 and 1014. The signal placed on transmission 1012 is transmitted to the adder bar mechanism, which includes adder bar 164 as a part thereof, schematically represented by 1016. This results in a subsequent error signal created on transmission 1018 which is directed to the servo 134 schematically represented by 1020.

A resulting hydraulic signal is conveyed from device 1020 to actuating members 52 by a suitable transmission 1022 which causes members 52 to react by varying the size of orifice 50.

As members 52 so react, a resulting feed back signal is created on transmission 1024 which leads to shaft 76 causing rotation thereof along with the associated cams schematically represented by device 1026.

The change in position of shaft 76 in device 1026 then causes a signal to be placed on transmission 1028 which finally nullifies the error previously induced in device 1016 by the signal on transmission 1012. A corresponding signal is also fed from device 1026 to transmission 1030 and is applied to cam 90 schematically illustrated by 1032.

A pressure signal $P_{t5}$ as sensed by probe 41 is conveyed by a suitable transmission 1034 to the device schematically illustrated at 1036 which comprises generally the ratio computing device illustrated by FIGURE 6. A second pressure $P_0$, which is atmospheric pressure and sensed as at 280 (FIGURE 6), is also conveyed by a transmission 1038 to the device 1036. The resulting signal computed by device 1036 is placed on transmission 1040 and conveyed to the device 1032 which after appropriately reacting to the signal conveyed thereto by both transmissions 1030 and 1040 creates a resulting signal on transmission 1042.

The device 1044 which comprises generally the adder bar mechanism 240 illustrated by FIGURE 4 receives the signal from transmission 1042 and creates an error signal on transmission 1046 which is conveyed to the servo mechanism 184a which is schematically represented as a device 1048. The device 1048 then in turn creates a signal on transmission 1050 which causes movement of the actuating members 54 which control the area of orifice 16. As members 54 move, a feed back signal placed on transmission 1052 is conveyed to shaft 98 and associated cams schematically represented by the device 1054.

The device 1054 in turn creates a feed back signal on transmission 1056 nullifying the previous error signal of 1044. The signal that was created by device 1008 and placed on transmission 1014 is conveyed to the servo mechanism controlled by adder bar 470, illustrated in FIGURES 9 and 10, and schematically represented as a device 1058. A resulting error signal is created on transmission 1060 which causes movement of the device 436 illustrated by FIGURE 8 and schematically represented by device 1062. As the device 1062 responds to the signal created on transmission 1060, other signals are created on transmissions 1064 and 1066. The signal on transmission 1064 is a continuous feed back signal, to the device 1058, which seeks to nullify the error signal of transmission 1060 while the signal placed on transmission 1066 is fed to the afterburner fuel control 36 for the determination of proper fuel flows to the afterburner.

From the above it becomes obvious that generally the orifice size of throat 50, as determined by actuators 52, is a direct function of the pilot request signal and the temperature $T_5$ and that the diameter of orifice 16, as determined by actuators 54, is a function of the diameter of the throat 50 since the signal controlling the size of discharge orifice 16 is created by the position of actuators 52 which are reflective of the diameter of throat 50 and the ratio of $P_{t5}$ to $P_0$.

Referring now to the various figures for purposes of explaining the operation in greater detail, let it be assumed that the pilot power selector lever 1000 of FIGURE 1 has been rotated to a position requesting substantially maximum power. As this happens, shaft 56 of FIGURES 2 and 3 is rotated counter-clockwise by means of a suitable transmission 1006 causing cams 60, 62 and 64 to rotate accordingly. The rotation of cam 60 in turn moves follower 166 of adder bar 164 away from the centerline of shaft 56 causing the adder bar 164 to pivot about follower 168, which is in contact with cam 84 (FIGURE 9), in a generally counter-clockwise direction. The pivotal motion of adder bar 164 results in a corresponding pivotal movement of lever 170 (FIGURES 3 and 4) about its pivot 178 in a counter-clockwise direction. End 180 of lever 170, being secured to end 182 of servo valve member 184 (FIGURE 4), in turn causes the member 184 to move to the left uncovering ports 212 thereby allowing high pressure fluid into chamber 196.

As the pressure in chamber 196 increases, valve 200 is moved to the left and the high pressure fluid passes from conduit 220, into annulus 232 and out through conduit 234 to the hydraulic actuators 52.

As the diameter of throat 50 is changed, decreasing in area, the new position is continually indicated by the transmission 1024 which coacts with actuators 52 to rotate shaft 76 and the associated cams 82, 84 and 86 of FIGURE 2. During this time, transmission 1024 rotates shaft 76 in a generally counter-clockwise direction causing follower 168 of adder bar 164 to move toward the centerline of shaft 76. This movement of follower 168 results in a generally counter-clockwise rotation of adder bar 164 about the follower 166 which is in contact with cam 60 (FIGURE 9). The rotation of shaft 76 will continue until the movement of follower 168 is sufficient to offset the effect brought about by the previous movement of follower 166. It can be seen that generally cam 84, shaft 76, transmission 1024, actuators 52, adder bar 164, cam 60, shaft 56, lever 170 and the hydraulic network including servo valve 184 form a closed loop system; that is, an error is induced by the change in position of the pilot power selector lever 1000 which causes a change in the diameter of throat 50 and the change in diameter causes an increasing feed back signal which nullifies the previously induced error.

Because of the spline connection between shaft 76 and cam 90 (FIGURES 2 and 6) the rotational movement of shaft 76 causes a corresponding rotational movement of cam 90. As cam 90 so rotates, adder bar 240 (FIGURES 4 and 15) is caused to rotate about follower 244 which is in contact with cam 102. That is, follower 242 moves away from the centerline of shaft 76 during this period thereby causing the lever 236 to rotate counter-clockwise about its pivot 254 moving servo valve 184a to the right. As the servo valve 184a moves to the right the pressure within chamber 194a is increased by virtue of ports 210a being opened. Consequently, valve 200a is moved to the right allowing high pressure fluid to flow from conduit 220 through annulus 226a and out of conduit 228a to the actuators 54. As the actuators 54 are acted upon by the hydraulic pressure the discharge orifice 16 is decreased in diameter and a continuing signal is fed back through transmission 1052 to shaft 98 (FIGURE 2) causing counter-clockwise rotation of the shaft and associated cam 102. As cam 102 is so rotated follower 244 of adder bar 240 moves towards the centerline of shaft 98 thereby cancelling out the induced error caused by the initial rotation of cam 90 thereby returning the servo 184a to its null position.

From the above it can be seen that cam 90, follower 242, lever 236, the hydraulic circuitry including servo valve 184a, actuators 54, transmission 1052, shaft 98, cam 102, follower 244, and adder bar 240 comprise a second closed loop error detecting system which determines the size of discharge orifice 16 as a function of the error induced by cam 90 as brought about by the initial change in size of throat 50.

The rotation of shaft 56 as occasioned by the previous rotation of the pilot power selector lever 1000 also causes rotational movement of cam 64 (FIGURES 2 and 9). The counter-clockwise rotation of cam 64 causes follower 472 of adder bar 470 to move towards the centerline of shaft 56 thereby bringing about a generally clockwise rotation of the adder bar 470 about follower 468 which is in contact with cam 466. The rotation of adder bar 470 causes a corresponding clockwise rotation of lever 474 about its coacting pivot 484 thereby moving the servo valve 462 further away from its coacting servo orifice. As servo valve 462 opens further pressure $P_{11}$ within conduit 460 will decrease in value (FIGURES 8 and 10), causing piston 440 to move to the left and rotate shaft 74 by means of coacting rack 442 and gear 72. The signal generated by the rotation of shaft 74 is placed on transmission 1066 (FIGURE 1) and conveyed to the afterburner fuel control 36. As the shaft 74 is so rotated a corresponding and continuous feed back signal is generated by the action of cam 466 which is rigidly secured to shaft 74. As the cam 466 rotates in a counter-clockwise direction, follower 468 of adder bar 470 is moved toward the centerline of shaft 74 causing the adder bar to rotate in a clockwise direction, about follower 472 which is in contact with cam 64, thereby ultimately returning servo valve 462 to its null position. Accordingly, it is apparent that the above described elements form a third closed loop error detecting system.

In addition to the above, other provisions are made for modifying the various signals in accordance with other operating parameters. For example, FIGURE 3 illustrates means for modifying the axial position of cams 60, 62 and 64 in accordance with turbine discharge temperature. As temperature increases probe 42 generates a signal on transmission 1010, which may be conducted through a suitable amplifier, to the torque motor 124 causing a clockwise rotation of lever 156 about its coacting pivot 160 thereby moving servo valve 158 away from its coacting servo orifice 152. As the servo 158 is so moved, pressure $P_2$ reduces in value causing piston 114 to move some degree to the right thereby altering the axial position of cams 60, 62 and 64.

FIGURE 6 illustrates another portion of the overall control which is used to modify the signal generated on cam 90 with respect generally to the ratio of atmospheric pressure to turbine discharge pressure. The atmospheric pressure sensing device may be a pitot tube illustrated generally at 280 which creates a pressure signal ultimately conveyed to torque motor 276. Let it be assumed for the moment that atmospheric pressure remains constant but the turbine discharge pressure increases. As the turbine discharge pressure $P_{t5}$ increases probe 316 senses and conveys the pressure increase to bellows 304 which cause servo lever 324 to rotate counter-clockwise about pivot 326 by means of levers 312 and 314. As the lever 324 rotates, servo valve 328 is moved further away from its coacting seat causing the pressure $P_9$ within chamber 338' to decrease causing piston 332 to move upwardly. As piston 332 so moves, the force of spring 400 is transmitted through rollers 420 and 422 and retainer 424 to the moment arm 324 at a greater effective lever arm thereby causing the servo 328 to move to its null position. Rod 426, which is operatively connected to piston 332, causes cam 90 to change its axial position with respect to shaft 76. Accordingly, the previous position of cam 90, as determined by the rotational movement of shaft 76, is altered in an axial direction in accordance with the ratio between atmospheric and turbine discharge pressure.

Let it be assumed now for purposes of illustration that the turbine discharge pressure $P_{t5}$ remains constant while atmospheric pressure as sensed by probe 280 increases. As atmospheric pressure increases, the signal is transmitted to torque motor 276 which causes the lever 370 to rotate counter-clockwise about its pivot 376 causing servo valve 298 to more nearly close off its coacting orifice 384. Consequently, pressure $P_6$ increases causing piston 330 to move downwardly thereby causing a greater moment to be placed on lever 416. As a result of the greater moment on lever 416 the force transmitted by rollers 420 and 422 is increased. As this force increases, lever 324 more nearly closes off its servo orifice causing piston 332 and rod 426 to move downwardly thereby nulling out the servo 328 and once more altering the axial position of cam 90 with respect to shaft 76.

The graph of FIGURE 20 illustrates the relationship between the position of the power selector lever 1000 and the area of the throat 50. For example, when the power selector lever 1000 is moved from 0° to maximum power position, the area of throat 50 will change by following the graph described by lines 682, 684, 686 and 688. The other lines 690, 692 and 694 represent certain limits which will be subsequently discussed.

The graph of FIGURE 21 illustrates the relationship existing between the area of throat 50 and discharge orifice 16 for varying pressure ratios of turbine discharge pressure, $P_{t5}$, to atmospheric pressure, $P_0$. For example, curves A, B, C, D and E represent the existing areas for the correspondingly labeled pressure ratios. Additionally, curve F illustrates the minimum area that discharge orifice 16 can attain regardless of the existing pressure ratio.

The graph of FIGURE 22 illustrates the relationship between the position of the power selector lever 1000 (or shaft 56) and the request for fuel flow to the afterburner as determined by the position of shaft 74. For example, it can be seen that in the preferred embodiment of the invention, there is no afterburner throttle initiation until the power selector lever 1000 (or shaft 56) has been rotated at least 65° in the power-increasing direction. Once initiation is accomplished, and the power lever 1000 is rotated further to the maximum power position, the afterburner throttle will respond by requesting additional quantities of afterburner fuel in accordance with the curve described by lines 696, 698, 700 and 702. Lines 704, 706, and 708 represent, generally, the translation of the general curve in accordance with the temperature signal $T_5$; whereas, line 710 represents another limit to be subsequently discussed.

FIGURE 19 illustrates what might be referred to generally as the hydraulic power system employed for actuating the various valve assemblies and moving the hydraulic slaves.

The mechanisms of FIGURES 3, 6 and 8 were illustrated, for purposes of clarity, in conjunction with individual sources of high pressure fluid. Each of such sources was labeled with a reference number "126." In practice, and in view of the disclosure thus far, it is evident that a single source of high pressure fluid is sufficient. Accordingly, FIGURE 19 illustrates a source of high pressure fluid or pump 126 which furnishes all of the mechanisms with motivating fluid.

The pump 126 supplied by a reservoir 742 delivers hydraulic fluid at a relatively high pressure $P_1$, to conduit 746 which has various branch conduits in communication therewith. For example, conduit 496' which contains a restriction 748 therein communicates high pressure fluid to the limiting piston 510 (see FIGURE 3 also) which in turn communicates with a check valve 526, illustrated in greater detail in FIGURE 12, as by means of conduit 536.

Pressure $P_{13}$ which exists between restriction 748 and check valve 526 is variable in nature. That is, when valve 526 is opened as by the action of cam surface 542 and follower 524, pressure $P_{13}$ is lowered in value and approaches the low reference pressure as a limit thereby allowing piston 510 to move to its extreme right position (FIGURE 3). As piston 510 so moves, lever 512 is rotated clockwise thereby either establishing a limit for follower 472 in its travel toward the centerline of shaft 56 or actually lifting the follower 472 off the surface of cam 64, as the case may be.

However, when check valve 526 is closed, pressure $P_{13}$ increases in value and assumes the value of pressure $P_1$ as an ultimate limit. During this time, of course, lever 512 is rotated counter-clockwise therefore presenting no limiting action to the movement of follower 472 of adder bar 470 which controls the servo valve 462 illustrated in FIGURE 10.

Previously it was stated that as follower 472 approached the centerline of shaft 56 servo valve 462 would be opened an increasing amount thereby reducing pressure $P_{11}$ in chamber 448 (FIGURE 8) causing the piston 440 to move to the left. Such movement of piston 440 causes increased fuel flow through the afterburner fuel control 36 (FIGURE 1). Consequently, the function of piston 510, lever 512 and check valve 526 is to limit and/or delay the response of the afterburner fuel control, by preventing the follower 472 from more nearly approaching the centerline of shaft 56, whenever a certain operating condition exists. Such a condition, in this case, is the size of the throat orifice 50. That is, the preferred embodiment of the invention is so constructed as to prevent any afterburner initiation until a predetermined minimum area of the venturi orifice 50 is attained.

This is accomplished by having the shaft 76 and cam surface 542 positioned angularly in accordance with a feedback signal so as to be indicative of the area of orifice 50. The limiting function exerted on afterburner initiation by piston 510 and cam surface 542, generally, is graphically illustrated by line 710 of FIGURES 22 and 23.

Conduit 128 supplies high pressure fluid at a pressure $P_1$ to the piston assembly 114 of FIGURE 3. As previously stated in the discussion relative to FIGURE 3, cams 60, 62 and 64 are angularly positioned in accordance with operator request, and axially positioned in accordance with turbine discharge temperature $T_5$. However, in addition to the above, a third means is provided for axially positioning cams 60, 62 and 64. Such means is comprised of a conduit 632 communicating between chamber 120, as by means of conduit 150, and check valve 638 of assembly 590 (see FIGURE 16 also).

As follower 166 (see FIGURES 3 and 16) moves away from the centerline of shaft 56 by the action of cam 60, lever 586 will be rotated clockwise about its pivot 588.

When follower 166 has moved a sufficient amount, end 622 of lever 586 will engage end 624 of lever 592, and subsequently cause counterclockwise rotation of lever 592 about pivot 594. As lever 592 is so rotated, end 626 thereof unseats ball check valve 638 as by means of member 628.

A ball valve 638 is so moved, pressure $P_2$ in chamber 120 (FIGURE 3) will be reduced approaching the low reference pressure as a limit. Consequently piston assembly 114 will move toward the right causing cams 60, 62, and 64 to move along with it. Since the original action was brought about by follower 166, it is evident that the piston assembly 114 and associated cams will move to the right until follower 166 assumes a position on cam 60 which allows the ball valve 638 to again tend to return to the seated position. At this time pressure $P_2$ will again be increasing to its previous value and attempting to establish a condition of equilibrium.

In view of the above, it can be seen that the piston assembly of FIGURE 3 has two means of positioning cams 60, 62 and 64, that being, the manual operator input request and the modification of that request by the signal generated in accordance with turbine discharge temperature, and it is evident that the signal generated in accordance with turbine discharge temperature can be overridden by the limiting device 590 (FIGURE 16) which is capable of moving the piston assembly 114 regardless of the $T_5$ signal. The limiting function of assembly 590 is graphically illustrated by line 688 of FIGURE 20 under normal conditions and line 694 of FIGURE 20 under off-speed conditions. By "off-speed" is meant that transient portion between the request for additional engine speed or power and the time when the engine attains a speed approaching the requested speed.

Pump 126 also supplies high pressure hydraulic fluid at a pressure $P_1$ as by means of conduit 344 to the force balance subassembly 264 (see FIGURE 6 also). As previously stated, the subassembly of FIGURE 6 is responsive generally to the parameters of turbine discharge pressure and total static atmospheric pressure; however, the limiting device 554' of FIGURE 15 is in communication with chamber 338' as by means of conduit 578' and is effective to at times override the signal force developed by the turbine discharge pressure.

For example, shaft 76, the angular position of which is indicative of the size of the throat orifice 50, carries thereon a cam 90 which positions the adder bar 240 by means of follower 242. Whenever follower 242 is raised sufficiently, because of the action of cam 90, ball valve 568' will be unseated by member 564' contacting the surface 580. Accordingly, whenever ball valve 568' is so unseated chamber 338', which is at a pressure $P_9$, is brought into communication with the low reference pressure thereby causing pressure $P_9$ to reduce in value and approach the low reference pressure as an ultimate limit. Consequently, piston 330 will move upwardly until follower 242 is returned to a position whereby ball valve 568' is once more seated. In view of the above it becomes apparent that the valve assembly 554' acts as an absolute limit on the maximum diameter of discharge orifice 16 regardless of the request indicated by the signals of atmospheric pressure, compressor discharge pressure and operator request. The limiting function of valve assembly 554' is graphically illustrated by line 711 of FIGURE 21. The purpose of such a maximum limit is to enable the adaptation of the invention to various aircraft with a minimum number of changes. That is, as between any two aircraft it may be that one requires a greater maximum limit than the other. The only change then would be to provide adequate shims to effect the change.

In addition to the limiting device 590 of FIGURE 16 a second limiting device 642 of FIGURE 17 is provided to at times limit the travel of follower 166 towards the centerline of shaft 56. For example, during normal operation high pressure fluid is directed as by means of conduit 660 which contains a restriction 750 therein to chamber 658 and to chamber 558 of FIGURE 14 by means of conduit 578 communicating between the respective chambers. Ball check valve 568 of FIGURE 14 is normally in a closed position thereby maintaining both chambers 558 and 658 at a high and variable pressure which is either equal to or very nearly approaches the value of pressure $P_1$. During this time, piston 656 is caused to move upwardly against the action of spring 654 thereby rotating lever 644 generally counter-clockwise about pivot 646 because of the retention of end 664 by the slot 666. The counter-clockwise rotation of lever 644 causes end 662 to raise thereby allowing lever 586 to have greater freedom of rotation in a clockwise direction about pivot 588 so as to allow follower 166 to more nearly approach the centerline of shaft 56.

The adder bar 548 transmits movement of member 564 which is the algebraic displacement of follower 550 and 552 as brought about by cams 100 and 86 respectively. Whenever the algebraic movement is sufficient to unseat ball valve 568 the pressure in both chambers 558 and 658 is decreased thereby allowing spring 654 (FIGURE 17) to return piston 656 to its lowermost position thereby lowering end 662. The placement of end 662 in its lower position in turn causes a limit to be placed on the degree to which lever 586 may be rotated in a clockwise direction. Consequently, since lever 586 is connected to follower 166 as by means of end 618 the degree to which follower 166 may approach the centerline of shaft 56 is also restricted. In other words when end 662 is in its lowermost position it establishes a minimum on the size which throat orifice 50 can assume.

The preferred embodiment of the invention is constructed so as to have a predetermined ratio of discharge to throat orifice areas which can not be reduced. This is provided in order to insure certain minimum thrust properties. Accordingly, the above described elements serve as the means for positively preventing the ratio of areas to become less than that predetermined ratio, which, in this case is:

$$\frac{\text{Area } 16}{\text{Area } 50} = 1.10$$

For example, if the discharge orifice 16 should start reducing in area because of some reason, such as possibly some instability of components, cam 100 (FIGURE 14) would raise ball valve 568 as by means of follower 558 and member 564, causing end 662 of lever 644 (FIGURE 17) to move downwardly thereby lifting follower 166 off cam 60. As adder bar 164 is so rotated, servo 182 (FIGURE 4) is moved to the left allowing high pressure fluid to be transmitted by conduit 234 to piston assembly 52 thereby, to some degree, closing throat orifice 50. This limiting function is also graphically illustrated as by line "E" of FIGURE 21.

Conduit 658, which contains a lightly spring loaded check valve 754 therein, is also adapted to at times communicate high pressure fluid from conduit 746 to chamber 767 of assembly 642 (FIGURE 17). A second conduit 784 having solenoid valve 756 connected serially therein is in communication between conduit 746 and conduit 678 at a point between chamber 676 and check valve 754. Electrical conductors 758 and 760 of solenoid valve 756 are connected to terminals 762 and 764, respectively, of the electrical circuit containing a source of electrical energy 766 and switch 768. Switch 768 is adapted to be actuated in accordance with, for example, the position of the landing gears of the aircraft. This is provided in order to indicate to the control generally under what conditions the engine is operating.

During periods of ground idle, that is those periods of engine operation wherein engine speed is increased prior to actual takeoff, switch 768 will be closed thereby completing the circuit and energizing solenoid valve 756 so as to allow communication through conduits 784 and 678 and subsequently into chamber 676. Such admission of high pressure fluid causes piston 670 and rod 668 to move downwardly thereby raising end 662 of lever 644 allowing venturi orifice 50 to assume a maximum diameter which diameter is graphically illustrated by lines 682 and 690 of FIGURES 20 and 23. Lines 682 and 690 are actually extremities of a band of limits which can be determined by adjustment of stop screw 680 (FIGURE 17).

After the aircraft has completed takeoff and the landing gears are retracted, switch 768 will be opened causing solenoid valve 756 to terminate flow through conduit 784 thereby allowing spring 674 to urge piston 670 and member 668 upwardly. As piston 670 assumes the new position, a new limit is established on a maximum area which venturi orifice 50 may assume. This is what is regarded as flight idle and schematically illustrated at line 692 of FIGURES 20 and 23. It should be noted that whenever solenoid valve 756 is opened, flow through conduit 678 must be in the direction of assembly 642 since check valve 754 prevents flow in the opposite direction.

A valve mechanism 752 connected serially in conduit 678 at a point between check valve 754 and conduit 746 is adapted to be opened so as to allow communication therethrough in response to a signal generated by the main fuel control 24 or alternatively the afterburner fuel control 36. However, regardless of where the signal is actually generated, it is so timed as to reflect afterburner initiation; that is, valve assembly 752 is closed during those periods of operation prior to the firing of the afterburner.

Assuming now that the signal has been generated opening valve 752, high pressure fluid of $P_1$ will be communicated therethrough and into chamber 676 (FIGURE 17). This allows, as previously explained, throat orifice 50 to again assume a larger area as subsequent conditions warrant. However, initiation of the afterburner does not occur until approximately 75° of rotation of shaft 56 or as illustrated by the substantially horizontal line 698 of FIGURES 22 and 23. Accordingly, it becomes apparent that after takeoff the diameter of throat orifice 50 will generally follow lines 684 and 686 thereby becoming progressively smaller before afterburner initiation can be accomplished and before the throat may once again become larger. This, too, is illustrated by FIGURES 20 and 23.

A stop limit piston 492 (FIGURE 10) is also in communication with conduit 678 at a point between valve assembly 752 and check valve 754 as by means of a conduit 496. The function of piston assembly 492 is to keep servo valve 462 seated thereby keeping piston assembly 440 in its extreme right position and preventing any afterburner initiation.

In view of the above, it becomes apparent that when valve 752 is caused to open as previously described high pressure fluid will also be directed through conduit 496 to the chamber beneath piston 492 thereby lifting the piston and allowing servo valve 462 to respond to any request signal placed on lever 474.

Conduit 610 containing valve assembly 770 therein is adapted to at times communicate high pressure fluid from conduit 746 to chamber 608 of assembly 590 (FIGURE 16). Whenever high pressure fluid is so directed into the chamber piston 604 is moved upwardly against the action of spring 602 causing lever 592 to rotate some amount in a clockwise direction about pivot 594. This causes end 624 of lever 592 to be placed in closer proximity to end 622 of lever 586. Consequently, a new limit is established for the minimum diameter which venturi orifice 50 may assume since any movement of follower 166 beyond such limit will cause check valve 638 to be unseated thereby reducing the value of pressure $P_2$ in chamber 120 (FIGURE 3). As previously explained, upon such an occurrence, cams 60, 62, and 64 which are connected to piston assembly 114 will move to the right so as to cancel the previously induced error signal.

Valve assembly 770 is the controlling mechanism for the introduction of high pressure fluid to assembly 590 and is substantially comprised of a body member 796 containing therein a rotary valve 772 which contains intersecting passages 782 and 780. The valve member 772 may be rotated either clockwise or counterclockwise so as to cause passages 782 and 780 to complete communication either between passages 778 and 776 or passages 774 and 776. That is, as valve member 772 is rotated clockwise, passage 782 will complete communication between passages 776 and 778 thereby allowing high pressure fluid to be directed to assembly 590; however, if valve 772 is rotated counter-clockwise to the position illustrated, passages 780 and 782 will complete communication between passages 774, and 776 thereby venting the assembly 590 to the low return pressure.

Valve assembly 770 is actuated in response to an external signal by any suitable means regardless of whether such means be electrical, mechanical or hydraulic. During periods of normal operation, valving member 772 is maintained in the position illustrated causing the piston 604 and lever 592 (FIGURE 16) to be in their lowermost position. However, under periods of off-speed operation, that is, the transient portion between the request for additional engine speed or power and the time when the engine attains a speed approaching the requested speed (acceleration), valving member 772 is caused to rotate clockwise so as to complete communication of high pressure fluid from conduit 746 to chamber 608. At this time, piston 604 is raised presenting a new limit on the size of the throat orifice 50 which limit is graphically illustrated by line 694 of FIGURES 20 and 23.

In view of the preceding discussion it is apparent that the invention has the following capabilities of:

(1) Varying the throat orifice size and discharge orifice size in accordance with various operating parameters;

(2) Maintaining a maximum diameter of the throat orifice during periods of ground idle;

(3) Indicating a condition of flight idle whereby a new maximum limit of the venturi discharge orifice is established;

(4) Establishing limits on the size of the throat orifice under conditions of both normal operation and off-speed (acceleration) operation;

(5) Preventing afterburner initiation until a predetermined minimum request of the operator has been sensed and satisfied by the control;

(6) Establishing an absolute maximum diameter of the discharge orifice which maximum can be varied to suit the particular dictates of the engine involved;

(7) Establishing an absolute minimum area of the discharge orifice which minimum is generally a function of the area of the then-existing throat orifice;

(8) Calculating the ratio of atmospheric pressure to turbine discharge pressure and thereby changing the then-existing relationship between the areas of the throat orifice and discharge orifice in accordance therewith;

(9) Establishing an absolute minimum ratio of the area of the discharge orifice to the area of the throat orifice regardless of the signals generated in accordance with other operating parameters; and

(10) Varying the time at which afterburner initiation can be accomplished in accordance with temperature (FIGURE 22, lines 704, 706, 708).

The above mentioned features and capabilities of the invention are by no means all inclusive but rather are mentioned for purposes of amplification in terms of broad concepts.

Although but one embodiment of the invention has been disclosed and described, it is apparent that other modifications of the invention are possible and no limitations other than those defined by the appended claims is intended.

What I claim as my invention is:

1. In a gas turbine engine having a turbine, a main burner supplied by a primary fuel control with a manual power selector lever, an afterburner, a temperature probe for sensing turbine outlet temperature, a tail pipe with an adjustable area discharge orifice, and movable members forming an adjustable area throat orifice disposed between the turbine and the discharge orifice, a control device for varying the throat orifice area, said device comprising:
   (a) an input shaft rotated in response to movement of said power selector lever,
   (b) a second shaft slidably located around said input shaft and positioned angularly thereby,
   (c) a cam secured to said second shaft for rotation therewith,
   (d) a piston means for at times imparting axial movement in one direction to said second shaft,
   (e) a torque motor means responsive to a turbine outlet temperature signal for imparting axial movement to said piston means,
   (f) a set of hydraulic cylinders for actuating said movable members,
   (g) a slave member for controlling the operation of said set of hydraulic cylinders,
   (h) a servo valve for controlling the position of said slave member,
   (i) an adder bar mechanism operatively connected to said cam for operating said servo valve in response to the position of said cam.

2. A device as defined in claim 1 including a second cam secured to said second shaft for rotation therewith, a second adder bar mechanism responsive to the rotation of said second cam, a servo mechanism controlled by said second adder bar mechanism, a piston responsive to movement of said servo mechanism, an afterburner fuel control responsive to a signal from said piston for determining fuel flow to said afterburner.

3. A device as defined in claim 2 including means responsive to the movement of said first adder bar mechanism for at times moving said second shaft axially in the opposite direction for over-riding said turbine outlet temperature signal.

4. A device as defined in claim 1 including feed-back control means from said hydraulic cylinders to the input of said servo valve.

5. A device as defined in claim 4 including a second cam secured to said second shaft for rotation therewith, a second adder bar mechanism responsive to the rotation of said second cam, a servo mechanism controlled by said second adder bar mechanism, a piston responsive to movement of said servo mechanism, an afterburner fuel control responsive to a signal from said piston for determining fuel flow to said afterburner.

6. A device as defined in claim 5 including means responsive to the movement of said first adder bar mechanism for at times moving said second shaft axially in the opposite direction for over-riding said turbine outlet temperature signal.

7. In a gas turbine engine having a turbine, a main burner supplied by a primary fuel control with a manual power selector lever, an afterburner, a temperature probe for sensing turbine outlet temperature, a first pressure probe for sensing turbine outlet pressure, a second pressure probe for sensing atmospheric pressure, a tail pipe with an adjustable area discharge orifice, and movable members forming an adjustable area throat orifice disposed between the turbine and the discharge orifice, a control device for varying both the throat orifice area and the discharge orifice area, said device comprising:
   (a) an input shaft rotated in response to movement of said power selector lever,
   (b) a second shaft slidably located around said input shaft and positioned angularly thereby,
   (c) a first cam secured to said second shaft for rotation therewith,
   (d) a piston means for at times imparting axial movement to said second shaft,
   (e) a torque motor means responsive to turbine outlet temperature for imparting axial movement to said piston means,
   (f) a first set of hydraulic cylinders for actuating said movable members,
   (g) a slave member for controlling the operation of said first set of hydraulic cylinders,
   (h) a first servo valve for controlling the position of said slave member,
   (i) a first adder bar mechanism operatively connected to said first cam for operating said servo valve in response to the movement of said first cam,
   (j) feed-back control means from said hydraulic cylinder to the input of said servo valve,
   (k) a ratio computing device responsive to compressor discharge pressure and atmospheric pressure,
   (l) a second cam rotated by said third shaft and moved axially in response to a signal from said ratio computing device,
   (m) a second set of hydraulic cylinders for actuating said discharge orifice area,
   (n) a second servo valve for operating said second set of hydraulic cylinders,
   (o) a second adder bar mechanism responsive to the movement of said second cam for operating said second servo valve,
   (p) a fourth shaft responsive to the movement of said second set of hydraulic cylinders for creating a nullifying signal to said second adder bar mechanism.

8. A device as defined in claim 7 including a third cam secured to said third shaft and a fourth cam secured to said fourth shaft a second check valve responsive to the movement of said third and fourth cams, a piston responsive to the movement of said second check valve, and a plurality of levers responsive to the movement of said piston and operatively connected to said first adder bar mechanism for establishing an absolute minimum ratio of said discharge orifice area to said throat orifice area regardless of engine operating parameters.

9. A device as defined in claim 7 including an additional cam secured to said second shaft, a third adder bar mechanism responsive to the rotation of said additional cam, a servo mechanism controlled by said third adder bar mechanism, a piston responsive to movement of said servo mechanism for causing a feed back signal to said servo mechanism and an afterburner fuel control responsive to a second signal from said piston for determining fuel flow to said afterburner.

References Cited in the file of this patent
UNITED STATES PATENTS

| | | |
|---|---|---|
| 2,619,794 | Lombard | Dec. 2, 1952 |
| 2,683,348 | Petry | July 13, 1954 |
| 2,706,383 | Jacobson | Apr. 19, 1955 |
| 2,805,543 | Lawry | Sept. 10, 1957 |
| 2,846,843 | Clark | Aug. 12, 1958 |
| 2,923,127 | Biehl | Feb. 2, 1960 |
| 2,955,416 | Hegg | Oct. 11, 1960 |